(12) United States Patent
Inada et al.

(10) Patent No.: US 9,605,643 B2
(45) Date of Patent: Mar. 28, 2017

(54) INTERNAL COMBUSTION ENGINE LEAKAGE DETECTION APPARATUS

(71) Applicant: Mitsubishi Electric Corporation, Tokyo (JP)

(72) Inventors: Takahiko Inada, Tokyo (JP); Takahiro Enomoto, Tokyo (JP); Yuhei Matsushima, Tokyo (JP); Takeshi Koda, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 190 days.

(21) Appl. No.: 14/679,091

(22) Filed: Apr. 6, 2015

(65) Prior Publication Data

US 2016/0201636 A1 Jul. 14, 2016

(30) Foreign Application Priority Data

Jan. 9, 2015 (JP) .................. 2015-002777

(51) Int. Cl.
| F02P 3/05 | (2006.01) |
|---|---|
| F02P 3/09 | (2006.01) |
| F02P 5/15 | (2006.01) |
| F02P 9/00 | (2006.01) |
| F02D 41/00 | (2006.01) |
| F02D 41/22 | (2006.01) |
| F02P 17/12 | (2006.01) |
| F02D 17/02 | (2006.01) |
| F02D 35/02 | (2006.01) |

(Continued)

(52) U.S. Cl.
CPC .............. *F02P 3/05* (2013.01); *F02D 17/02* (2013.01); *F02D 35/021* (2013.01); *F02D 41/0002* (2013.01); *F02D 41/0087* (2013.01); *F02D 41/221* (2013.01); *F02P 3/09* (2013.01); *F02P 5/15* (2013.01); *F02P 9/002* (2013.01); *F02P 17/12* (2013.01); *F23Q 23/00* (2013.01); *F01L 13/0005* (2013.01); *F01L 2013/001* (2013.01); *F02D 2041/0012* (2013.01); *F02P 2017/125* (2013.01)

(58) Field of Classification Search
CPC ...... F02P 3/05; F02P 3/09; F02P 9/002; F02P 17/12; F02P 2017/125
USPC .................. 123/406.12, 481, 198 F; 324/399
See application file for complete search history.

(56) References Cited

U.S. PATENT DOCUMENTS

| 2002/0069696 A1 | 6/2002 | Hatazawa et al. | |
|---|---|---|---|
| 2010/0089361 A1* | 4/2010 | Inada ..................... | F02P 17/12 123/406.12 |
| 2010/0258081 A1* | 10/2010 | Tanaya .................. | F02P 5/1502 123/406.58 |

FOREIGN PATENT DOCUMENTS

| JP | 3523542 B2 | 4/2004 |
|---|---|---|
| JP | 2004-263614 A | 9/2004 |

* cited by examiner

*Primary Examiner* — Mahmoud Gimie
(74) *Attorney, Agent, or Firm* — Sughrue Mion, PLLC; Richard C. Turner

(57) ABSTRACT

There is provided a leakage detection apparatus that can accurately detect a leakage condition in an internal combustion engine having a cylinder resting function. An ignition plug provided in the combustion chamber of a cylinder is made to generate an ignition signal at least once when based on an instruction from a cylinder resting control unit, a fuel injection valve and a valve driving mechanism are stopping the operation thereof; the leakage condition of the ignition plug is detected based on an output signal generated by an ion current detection circuit at a timing other than the timing when ignition discharge is caused.

10 Claims, 16 Drawing Sheets

(51) Int. Cl.
*F23Q 23/00* (2006.01)
*F01L 13/00* (2006.01)

INTERNAL COMBUSTION ENGINE LEAKAGE DETECTION APPARATUS

BACKGROUND OF THE INVENTION

Field of the Invention

The present invention relates to an internal combustion engine leakage detection apparatus and more particularly to an internal combustion engine leakage detection apparatus that detects leakage in an ignition plug of an internal combustion engine provided with a cylinder rest function.

Description of the Related Art

In recent years, the problems such as environment preservation and fuel depletion have been raised; measures for these problems have become big issues also in the automobile industry. As an example of the measure, in an internal combustion engine provided with two or more cylinders, there has been developed a so-called cylinder resting drive technology in which there is provided a cylinder resting function of resting fuel injection into part of the cylinders and valve driving and in which car driving is implemented only by the cylinders other than the resting cylinders.

In the foregoing cylinder resting drive, in many cases, the intake valve and the exhaust valve of a resting cylinder are fully closed in order to reduce the intake/exhaust loss of the internal combustion engine, i.e., the pumping loss thereof. Accordingly, the pressure inside of a hermetically sealed resting cylinder becomes negative as the piston moves; then, the oil or the like inside the crankcase of the internal combustion engine may intrude into the cylinder. Especially in the vicinity of the bottom dead center of the piston, the pressure inside of the hermetically sealed resting cylinder becomes largely negative; thus, oil or blowby gas intrudes into the resting cylinder from the crankcase. This phenomenon is referred as "oil rising".

In the case where a cylinder resting drive is carried out for a long time, oil rising contaminates the ignition plug and hence leakage may be caused in the ignition plug. In other words, in the case where oil or blowby gas including an electrically conductive material such as metal powder, soot, or moisture attaches oneself to the ignition plug, a decrease in the insulating resistance value of the ignition plug causes an ignition current to leak. When the ignition current increases, in the worst case, the probability of a misfire is raised even when the all-cylinder drive is resumed after the cylinder resting drive and then fuel is injected into the resting cylinder that has been resting.

Accordingly, to date, as disclosed in Patent Document 1, for example, there has been proposed a technology in which at a time of and after the start of the cylinder resting drive of an internal combustion engine, the level of contamination, caused by oil rising, in the ignition plug of the resting cylinder is estimated and then the ignition plug of the resting cylinder is ignited for a time that is long enough to cancel the estimated contamination of the ignition plug so that the contamination of the ignition plug is cancelled.

To date, for example, as disclosed in Patent Document 2, as an apparatus for detecting leakage in an ignition plug of an internal combustion engine, there has been proposed a misfire detection apparatus in which an ion current detection circuit detects an ion current that flows when a voltage is applied to an ion produced as an inflammable fuel-air mixture in the internal combustion engine combusts and in which whether or not leakage exists in the ignition plug is determined based a leakage current included in the detected ion current.

PRIOR ART REFERENCE

Patent Document

[Patent Document 1] Japanese Patent Application Laid-Open No. 2004-263614
[Patent Document 2] Japanese Patent No. 3523542

As described above, when a cylinder resting drive of an internal combustion engine is implemented, the pressure inside the resting cylinder becomes largely negative (an atmospheric pressure or lower: the same applies hereinafter) in the vicinity of the bottom dead center of the resting cylinder. In this situation, at a time when an ignition signal is generated, even an ignition-on induction voltage (a relatively low voltage, e.g., maximum 1 kV or so) that is generated across the secondary coil of the ignition coil device breaks the insulation in the counter gap in which the central electrode of the ignition plug and the ground electrode are facing each other, and hence a spark discharge is caused; thus, a discharge current may flows. Such a conventional misfire detection apparatus as disclosed in Patent Document 2 may erroneously detects the discharge current as a leakage current in the ignition plug.

When the contamination of the ignition plug is not detected before the oil rising intensely wets the depths portion of an insulator covering the central electrode of the ignition plug, oil or the like that has pooled in the depths portion of the ignition-plug insulator travels on the surface of the insulator to the gap between the central electrode of the ignition plug and a mounting bracket, whose electric potential is maintained at the ground potential, and/or the ground electrode; the gap between the central electrode and the mounting bracket and/or the ground electrode is short-circuited; then, the path for a leakage current is formed. Because the oil or the like that has pooled in the depths portion of the insulator of the ignition plug cannot sufficiently be removed only by such an ignition discharge as disclosed in Patent Document 1, it is required to sensitively detect the leakage current at a timing when the oil rising is liable to occur as much as possible so that the contamination of the ignition plug is removed by an ignition discharge or the like before the oil or the like pools in the depths portion of the insulator of the ignition plug.

In the conventional apparatus disclosed in Patent Document 1, the contamination condition of an ignition plug is determined based on the result of estimation of the inner-cylinder negative pressure; however, it is not clear whether or not a leakage has actually occurred in the ignition plug, and the condition of the ignition-plug contamination caused by oil rising may differ depending on the nature of the oil or the like, the temperature of the internal combustion engine, and the like; thus, there exists a problem, for example, that it is difficult to sufficiently remove the contamination of the ignition plug.

SUMMARY OF THE INVENTION

The objective of the present invention is to solve the problems in the foregoing conventional systems and to provide an internal combustion engine leakage detection apparatus that can sensitivity and accurately detect the condition of an leakage in an ignition plug.

An internal combustion engine leakage detection apparatus according to the present invention is to detect a leakage condition of an ignition plug of an internal combustion engine provided with a function of performing a cylinder resting drive and includes a valve driving mechanism that drives an intake valve and an exhaust valve provided on an internal combustion engine; a fuel injection valve provided on a cylinder of the internal combustion engine; a cylinder resting control unit that instructs the valve driving mechanism and the fuel injection valve of an operation-resting cylinder to stop operation thereof when the cylinder resting drive is implemented; an ignition control unit that makes an ignition plug provided in a combustion chamber of the cylinder generate an ignition signal at least once when based on the instruction from the cylinder resting control unit, the fuel injection valve and the valve driving mechanism are stopping the operation thereof; an ignition coil device provided with an ion current detection circuit that detects an electric quantity based on an ion generated in the combustion chamber when the ignition plug is made to perform ignition discharge based on the ignition signal and an inflammable fuel-air mixture in the combustion chamber combusts due to the ignition discharge; and a plug status detection unit that detects a leakage condition of the ignition plug. The internal combustion engine leakage detection apparatus is characterized in that the plug status detection unit detects a leakage condition of the ignition plug, based on an output signal of the ion current detection circuit generated at a timing other than the timing at which the ignition coil device performs the ignition discharge.

In the internal combustion engine leakage detection apparatus according to the present invention, whether or not there exists leakage is determined based on the output signal of the ion current detection circuit generated at a timing other than the timing at which the ignition-signal-on induction voltage generated during cylinder resting mode causes ignition discharge; therefore, no discharge current caused by the ignition-signal-on induction voltage is erroneously detected as a leakage current and hence it is made possible to accurately detect an abnormality in the status of the ignition plug of the internal combustion engine provided with a cylinder resting function.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENT(S)

Embodiment 1

Figure 1:
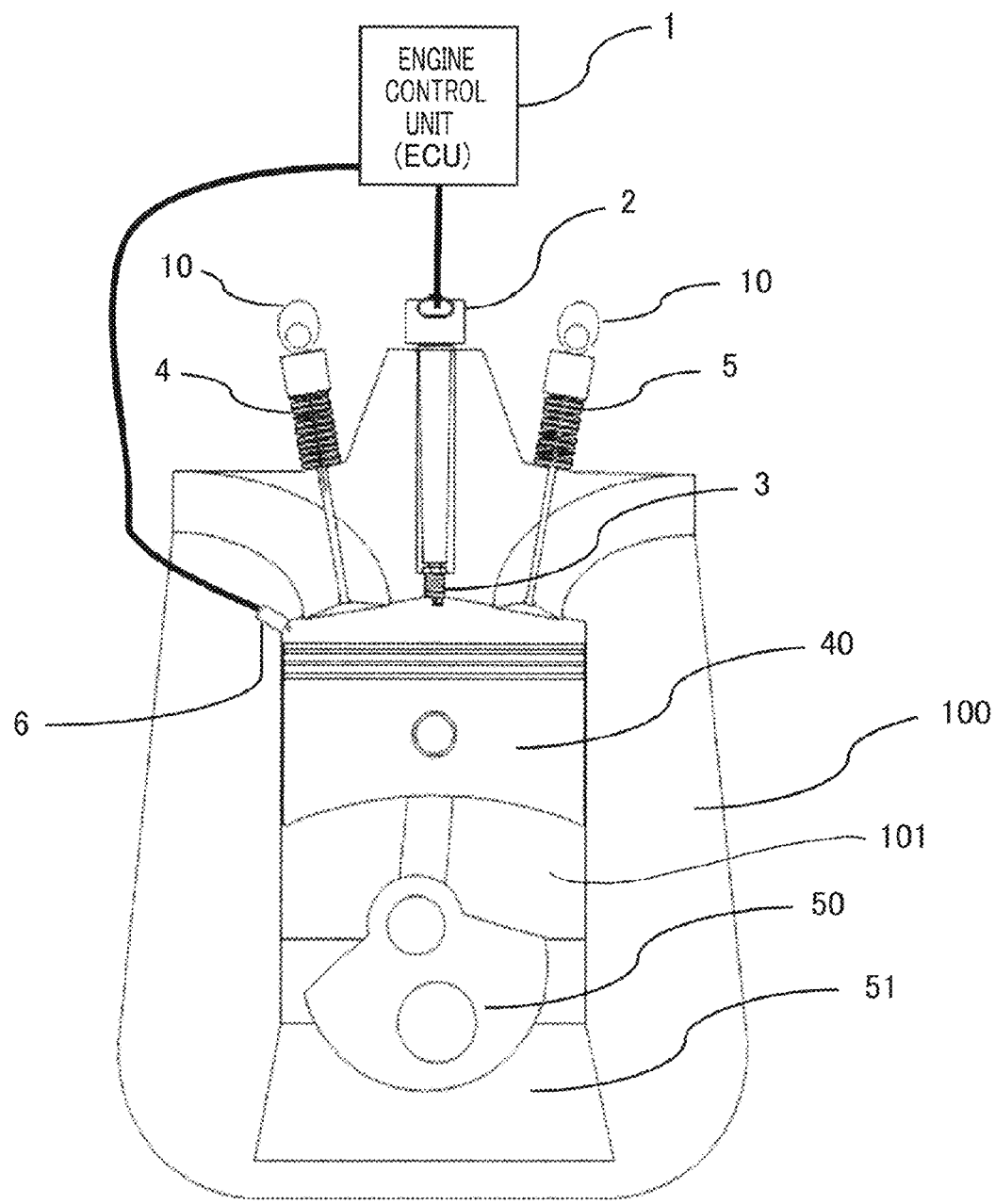
FIG. 1 is a configuration diagram schematically illustrating an internal combustion engine to which an internal combustion engine leakage detection apparatus according to Embodiment 1 of the present invention is applied.

Hereinafter, an internal combustion engine leakage detection apparatus according to Embodiment 1 of the present invention will be explained. FIG. 1 is a configuration diagram schematically illustrating an internal combustion engine to which an internal combustion engine leakage detection apparatus according to Embodiment 1 of the present invention is applied; the configuration diagram illustrates only a single cylinder among two or more cylinders. In FIG. 1, an ignition plug 3 connected with an ignition coil device 2 is provided on the top of a cylinder 100 of an internal combustion engine. A piston 40 coupled with a crankshaft 50 is contained in a cylinder liner 101 of the cylinder 100. A fuel injection valve 6 for injecting a fuel is provided in the cylinder 100. The fuel injection valve 6 stops fuel injection, based on a cylinder resting instruction, described later.

Moreover, the cylinder 100 of the internal combustion engine is provided with an intake valve 4, an exhaust valve 5, and a valve driving mechanism 10 for driving the intake valve 4 and the exhaust valve 5. Based on the cylinder resting instruction, the valve driving mechanism 10 can fix the intake valve 4 and the exhaust valve 5 in a closing state.

Figure 8:
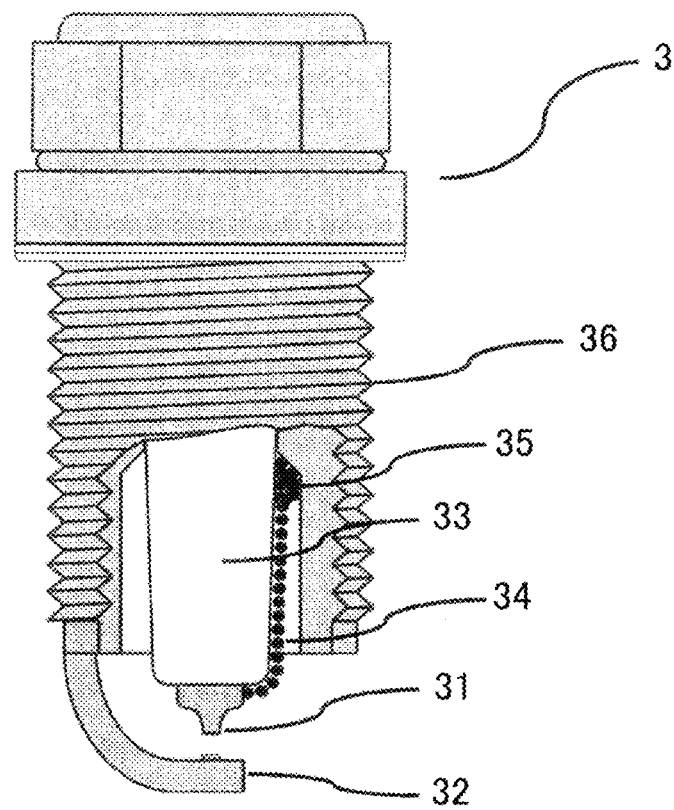
FIG. 8 is an explanatory view for explaining a leakage in an ignition plug of an internal combustion engine.

As illustrated in FIG. 8, described later, the ignition plug 3 is provided with a first electrode 31, which is a central electrode to which an ignition voltage for implementing a spark discharge is applied, and a second electrode 32, which is a ground electrode (referred to also as a side electrode) whose electric potential is maintained at the ground potential. The first electrode 31 and the second electrode 32 face each other across an opposing gap. When the foregoing ignition voltage is applied to the gap between the first electrode 31 and the second electrode 32, a spark discharge occurs in the opposing gap; then, an inflammable fuel-air mixture inside the cylinder liner 101 of the cylinder 100 is ignited or catches fire (referred to simply as "ignition", hereinafter) and combusts. When at a time of cylinder resting drive, the cylinder 100 becomes a resting cylinder, fuel injection by the fuel injection valve 6 of the cylinder 100 is stopped based on the cylinder resting instruction; therefore, no combustion occurs in the combustion chamber of the cylinder liner 101 and hence only a spark discharge occurs in the opposing gap between the first electrode 31 and the second electrode 32 of the ignition plug 3. In this situation, because no combustion occurs, no ion is produced.

Figure 3:
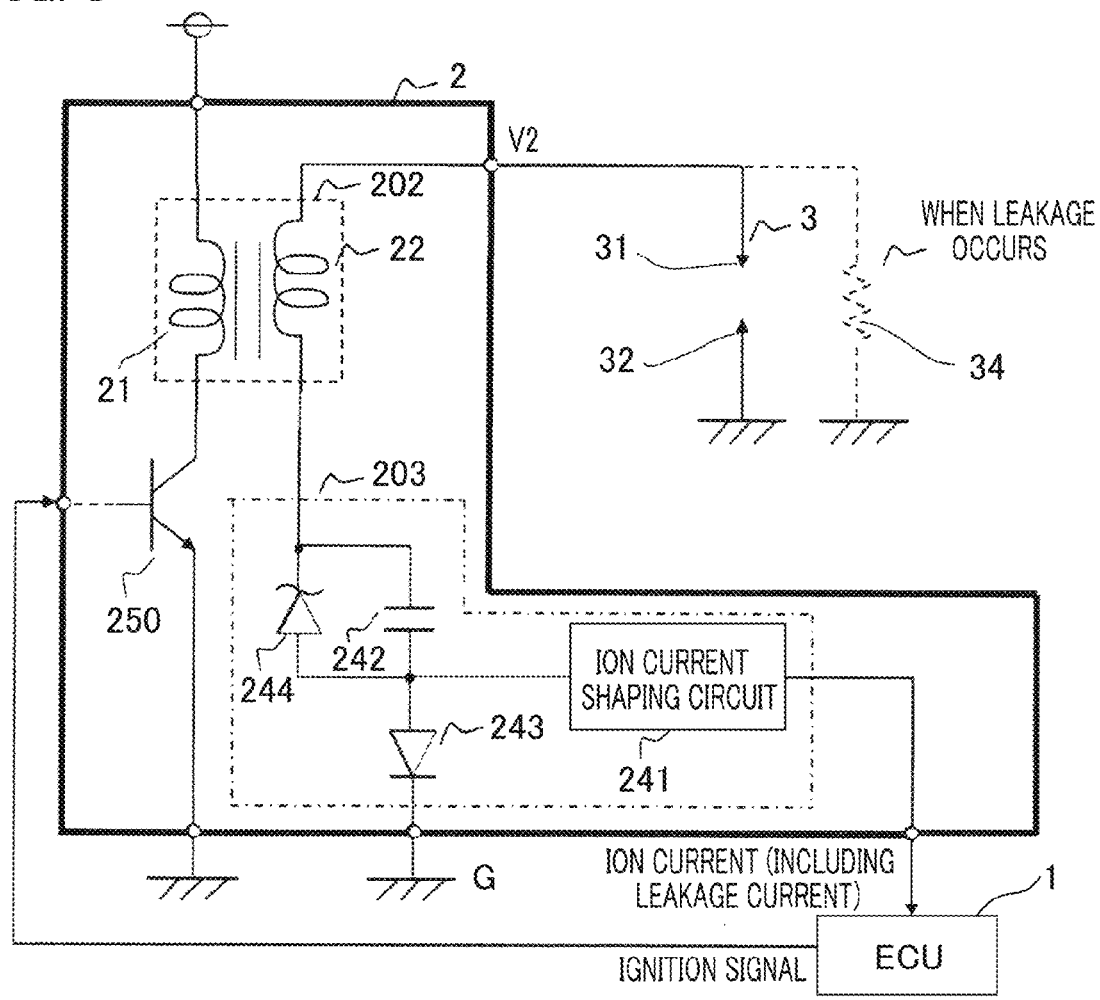
FIG. 3 is a circuit diagram illustrating the internal combustion engine leakage detection apparatus according to Embodiment 1 of the present invention.

In FIG. 1, the ignition coil device 2 is mechanically and integrally fixed to the ignition plug 3; as represented in FIG. 3, described later, the ignition coil device 2 is provided with a primary coil 21 connected with a power source formed of a battery, a secondary coil 22 coupled with the primary coil 21 through a magnetic iron core, and an ion current detection circuit 203. The operations of the ignition plug 3, the fuel injection valve 6, the intake valve 4, the exhaust valve 5, and the like are controlled by an engine control unit (referred to as an ECU, hereinafter) 1.

Figure 2:
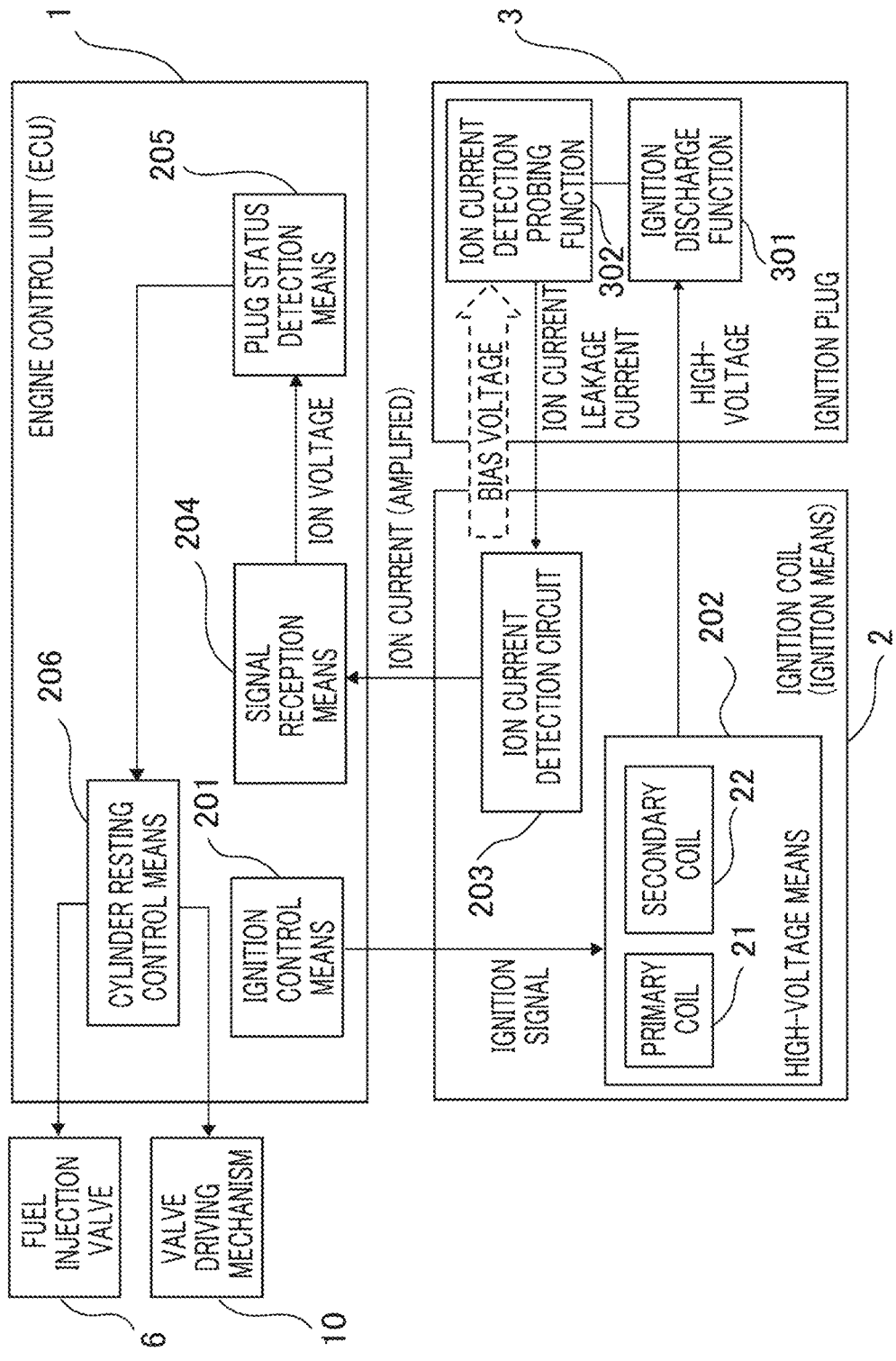
FIG. 2 is a block diagram illustrating the internal combustion engine leakage detection apparatus according to Embodiment 1 of the present invention.

FIG. 2 is a block diagram illustrating the internal combustion engine leakage detection apparatus according to Embodiment 1 of the present invention. In FIG. 2, the ECU 1 is provided with an ignition control unit 201, a signal reception unit 204, a plug status detection unit 205, and a cylinder resting control unit 206. The ignition control unit 201, the signal reception unit 204, the plug status detection unit 205, and cylinder resting control unit 206 are configured with respective software programs.

The ignition coil device 2 is provided with a high voltage generation unit 202 and the ion current detection circuit 203. The high voltage generation unit 202 is provided with the primary coil 21 and the secondary coil 22. The ion current detection circuit 203 has a function of applying a bias voltage between the first electrode and the second electrode of the ignition plug 3 so as to make an ion current flow and detecting the ion current and a leakage current that flows along with the ion current.

The ignition plug 3 has an ignition discharge function 301 of producing a spark discharge for igniting a fuel-air mixture by an ignition voltage to be applied between the first electrode 31 and the second electrode 32 by way of the secondary coil 22 of the ignition coil device 2 and an ion current detection probing function 302 for making the ion current detection circuit 203 detect the ion current and the leakage current.

The signal reception unit 204 of the ECU 1 receives a signal (hereinafter, simply referred to as an ion current signal), which is an ion current and/or a leakage current that is detected, amplified, and then outputted by the ion current detection circuit 203; then, the signal reception unit 204 coverts the received ion current signal into an ion voltage signal and then outputs the ion voltage signal to the plug status detection unit 205. In response to the inputted ion voltage signal, the plug status detection unit 205 outputs a cylinder resting signal to the cylinder resting control unit 206, based on a detected contamination condition of the ignition plug 3. In response to the inputted cylinder resting signal, the cylinder resting control unit 206 stops the fuel injection valve 6 from injecting a fuel and controls the valve driving mechanism 10 so as to close the intake valve 4 and the exhaust valve 5.

FIG. 3 is a circuit diagram illustrating the internal combustion engine leakage detection apparatus according to Embodiment 1 of the present invention. In FIG. 3, the ion current detection circuit 203 provided in the ignition coil device 2 includes a capacitor 242 connected with the low voltage side of the secondary coil 22, a diode 243 inserted between the capacitor 242 and a ground potential position G of the ignition coil device 2, a voltage-limiting Zener diode 244 connected in parallel with the capacitor 242, and a switching device 250 formed of a transistor connected in series with the primary coil 21. The capacitor 242, the diode 243, and the Zener diode 244 are included in a bias circuit for applying a bias voltage between the first electrode 31 and the second electrode 32 of the ignition plug 3. The switching device 250 turns on when an ignition signal from the ECU 1 is high-level (hereinafter, referred to as "H Level") and turns off when the ignition signal is low-level (hereinafter, referred to as "L Level").

When an ignition voltage generated across the secondary coil 22 is applied across the first electrode 31 and the second electrode 32 of the ignition plug 3, a dielectric breakdown is caused in an opposing gap where the first electrode 31 and the second electrode 32 face each other, and hence a discharge current accompanied by a spark flows therein. This discharge current flows in a closed circuit including the ground potential position G, the second electrode 32, the first electrode 31, the secondary coil 22, the capacitor 242, the diode 243, and the ground potential position G. This closed circuit functions as a charging circuit for the capacitor 242 and charges the capacitor 242 up to a predetermined voltage, for example, approximately 100 V. The capacitor 242 that has been charged up to the predetermined voltage functions as a bias power source for making an ion current flow, and applies the predetermined voltage, as a bias voltage, between the first electrode 31 and the second electrode 32 after the discharge current disappears.

When a spark discharge is caused in the opposing gap where the first electrode 31 and the second electrode 32 face each other, an ion is formed in the opposing gap and the vicinity thereof. Accordingly, when the foregoing bias voltage is applied across the first electrode 31 and the second electrode 32, an ion current flows in a closed circuit including the first electrode 31, the second electrode 32, the ground potential position G of the ignition coil device 2, an ion current shaping circuit 241, the capacitor 242, and the secondary coil 22. When a leakage path 34, indicated by a broken line in FIG. 3, is formed in the ignition plug 3, a leakage current that flows in the leakage path 34 flows in such a way as to be superimposed on the foregoing ion current. In this situation, the ion current shaping circuit 241 performs processing such as amplifying the ion current and the leakage current. The ion current detection circuit 203 includes the capacitor 242, the Zener diode 244, the diode 243, and the ion current shaping circuit 241.

In each of FIGS. 2 and 3, the ECU 1 obtains the output of the ion current shaping circuit 241 through the signal reception device 204. The signal reception unit 204 converts the ion current signal from the ion current shaping circuit 241 into the ion voltage signal, further converts, through an A/D converter, the ion voltage signal into a digital signal that is processed by a microcomputer, and inputs the digital signal to the plug status detection unit 205. The plug status detection unit 205 processes the inputted ion voltage signal and determines whether or not a leakage has been caused in the ignition plug 3.

The ECU 1 issues the cylinder resting instruction with which in accordance with the operation condition of the internal combustion engine, the cylinder resting control unit 206 makes the fuel injection valve 6 stop the fuel injection and makes the intake valve 4 and the exhaust valve 5 stop at the respective closed positions. On the other hand, the ECU 1 issues a valve drive restoration instruction with which the drive of the intake valve 4 and the exhaust valve 5, which has been stopped, is restored.

Moreover, when the plug status detection unit 205 determines that a leakage has been caused, the ECU 1 generates the valve drive restoration instruction for several cycles of an internal-combustion-engine process so as to make a gas inside the cylinder 101 move for purifying the ignition plug 3 and prohibits the cylinder resting drive so as to restore the normal drive.

Figure 4A:
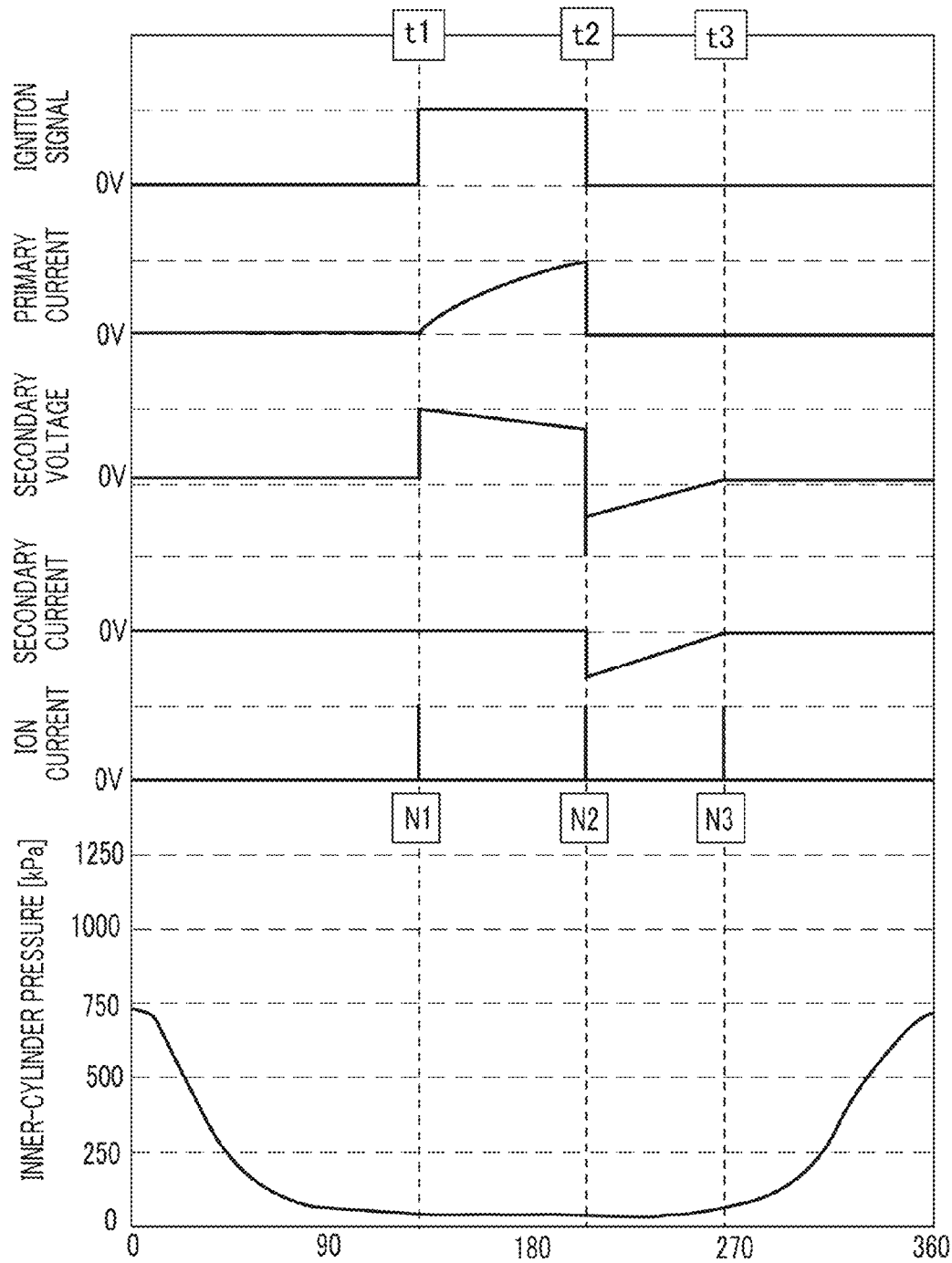
FIG. 4A is a timing chart for explaining the operation of a leakage detection apparatus of the internal combustion engine leakage detection apparatus according to Embodiment 1 of the present invention.
Figure 4B:
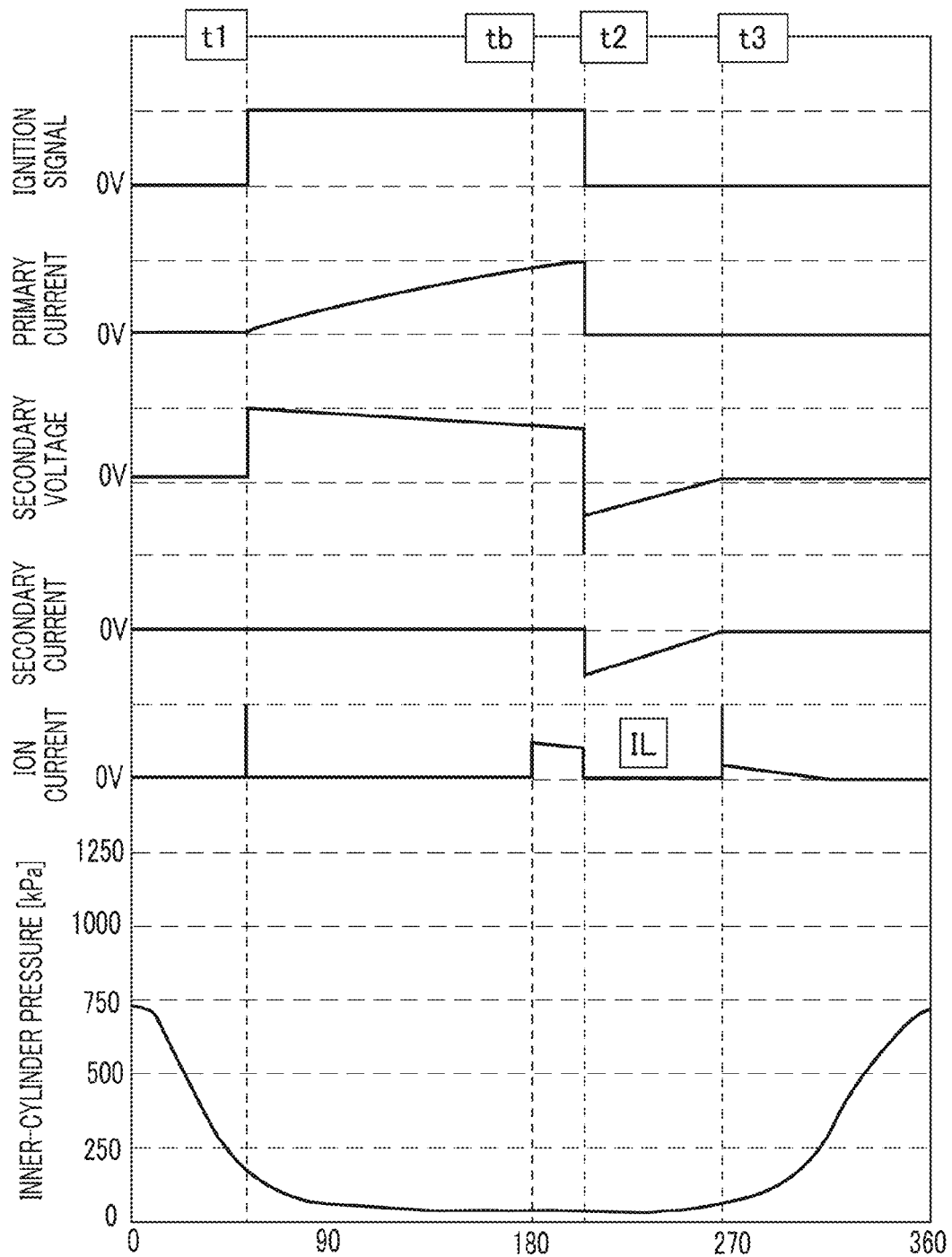
FIG. 4B is a timing chart for explaining the operation of the leakage detection apparatus of the internal combustion engine leakage detection apparatus according to Embodiment 1 of the present invention.
Figure 4C:
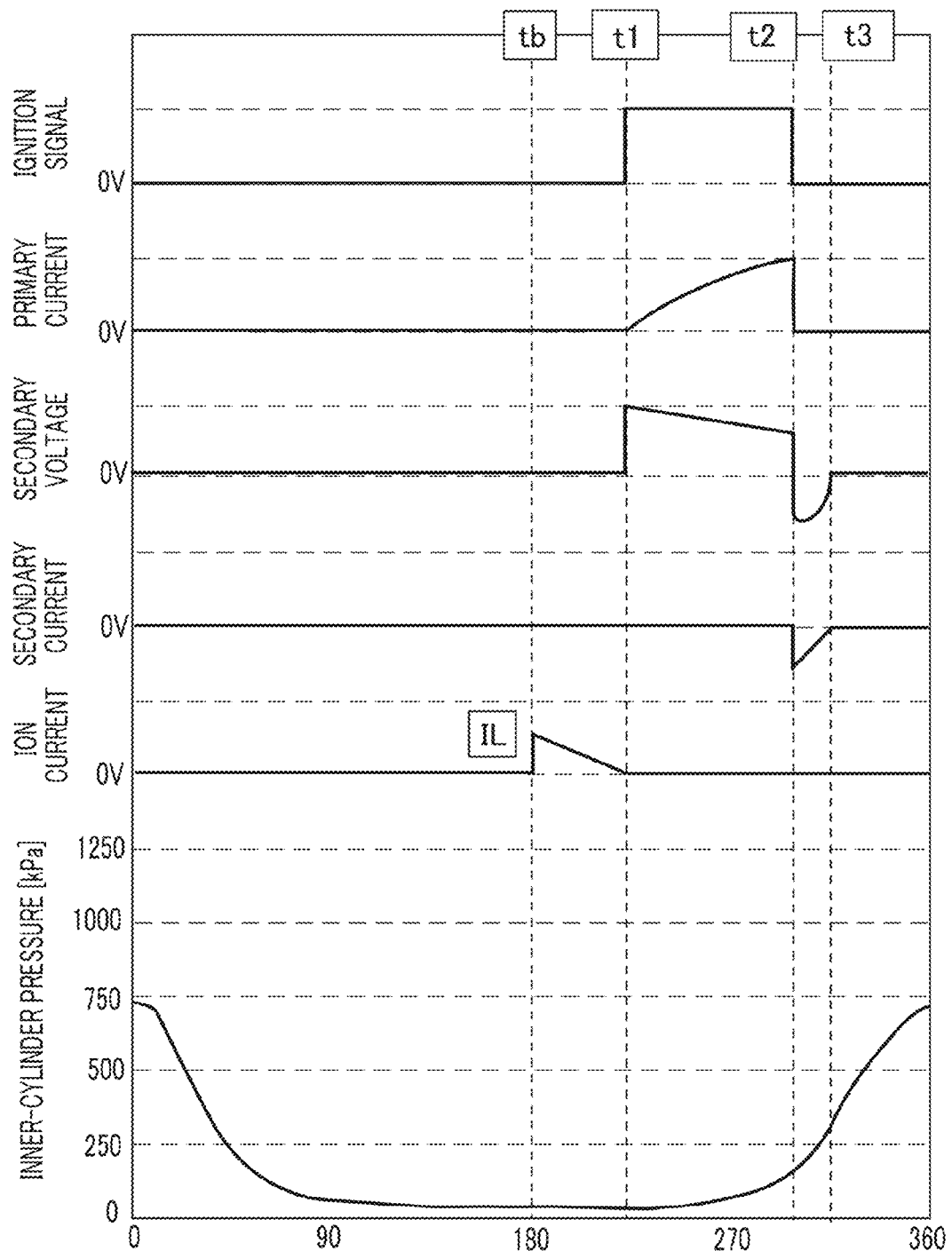
FIG. 4C is a timing chart for explaining the operation of the leakage detection apparatus of the internal combustion engine leakage detection apparatus according to Embodiment 1 of the present invention.
Figure 4D:
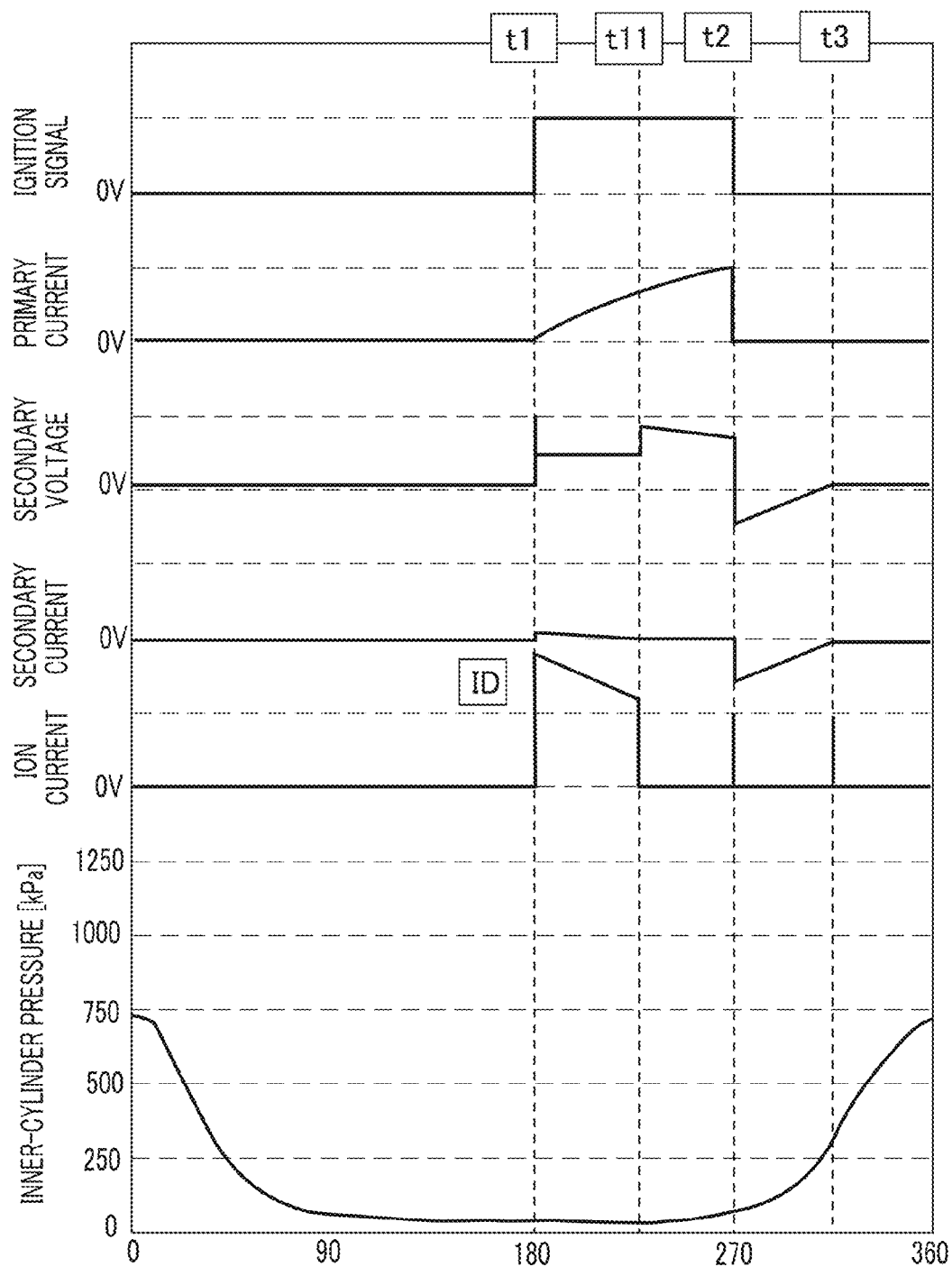
FIG. 4D is a timing chart for explaining the operation of the leakage detection apparatus of the internal combustion engine leakage detection apparatus according to Embodiment 1 of the present invention.

FIGS. 4A, 4B, 4C, and 4D are a set of timing charts for explaining the operation of the leakage detection apparatus of the internal combustion engine leakage detection apparatus according to Embodiment 1 of the present invention; the abscissa denotes the crank angle (corresponding to the time instant); the ordinates denote the ignition signal, the primary current flowing in the primary coil 21, the secondary voltage generated across the secondary coil 22, the secondary current flowing in the secondary coil, the ion current, and the inner-cylinder pressure [Kpa] of the cylinder 100 of the internal combustion engine in that order from the top stage to the bottom stage of the drawing. FIG. 4A represents the state where no leakage is caused in the ignition plug 3; each of FIGS. 4B and 4C represents the state where a leakage is caused in the ignition plug 3; FIG. 4D represents the state where no leakage is caused in the ignition plug 3 but an induction voltage at a time when the ignition signal is turned on makes a discharge current flow.

At first, the operation at a time when no leakage is caused in the ignition plug 3 will be explained. In FIG. 4A, at a time instant t1, the ignition control unit 201 in the ECU 1 switches the ignition signal for activating the ignition coil device 2 from L Level to H Level. As a result, the switching device 250 of the ignition coil device 2 is turned on, and hence a primary current starts to flow in the primary coil 21 of the ignition coil device 2 and gradually increases. When the primary current flows in the primary coil 21, the ignition coil device 2 starts energy accumulation. In addition, based on the primary current, a secondary voltage as the induction voltage is generated across the secondary coil 22 and gradually decreases. In the following explanation, the secondary voltage, generated across the secondary coil 22 at the time instant t1 at which the ignition signal becomes H Level, will be referred to as an "ignition-signal-on induction voltage". In general, the ignition-signal-on induction voltage is a value of as high as 1 kV.

Next, at a time instant t2, the ignition control unit 201 switches the level of the ignition signal from H Level to L Level. In response to that, the switching device 250 is turned off, and the primary current flowing in the primary coil 21 is cut off. As a result, a secondary voltage, as a negative-polarity ignition voltage, is instantaneously generated across the secondary coil 22. In general, the time instant t2 at which the ignition signal is switched from H Level to L Level is referred to as an ignition timing. The ignition voltage that is generated across the secondary coil 22 at the time instant t2 is an extremely high voltage and is provided to the first electrode 31 of the ignition plug 3. The ignition voltage applied to the first electrode 31 causes a dielectric breakdown in the opposing gap between the first electrode 31 and the second electrode 32; then, an ignition discharge current, i.e., a negative-polarity secondary current starts to flow at the time instant t2. The ignition discharge current is maintained in accordance with the amount of energy accumulated in the ignition coil device 2. Noise currents N1 and N2 flow in the ion current detection circuit 203 at the time instants t1 and t2, respectively; therefore, in many cases, measures for masking the noise currents N1 and N2 are taken at the time instants t1 and t2, respectively.

Next, at a time instant t3, the energy accumulated in the ignition coil device 2 decreases and hence the ignition discharge current, which is a secondary current, becomes lower than the level at which the ignition discharge can be maintained; thus, the ignition discharge ends. Then, although the residual energy remaining in the ignition coil device 2 tries to cause a dielectric breakdown again in the opposing gap of the ignition plug 3, the dielectric breakdown cannot be caused, and LC resonance caused by the inductance of the secondary coil 22 of the ignition coil device 2, the stray capacitance at the secondary coil side, the capacitor 242, and the like produces a noise current N3. The noise current N3 produced by the LC resonance is a capacitive current. The noise current N3 produced by the LC resonance flows in the ion current detection circuit 203; therefore, only the positive direction current thereof is detected as a current at a time when the discharge ends. The time between the time instant t2, which is an ignition timing, and the time instant t3 at which the noise current N3 produced by the LC resonance is detected is the ignition discharge duration.

When the ignition plug 3 performs ignition discharge operation, the ion current detection circuit 203 provided in the ignition coil device 2 generates a predetermined bias voltage, for example, a constant voltage of approximately 100 V, which is electric energy for detecting an ion produced when an inflammable fuel-air mixture inside the combustion chamber in the cylinder liner 101 of the cylinder 100 combusts, and then applies the predetermined bias voltage to the first electrode 31 of the ignition plug 3 after the spark discharge ends.

As described above, the ignition plug 3 has the ion current detection probing function 302 in addition to the ignition discharge function 301 and generates an ion current, as an electric quantity, based on an ion produced when the bias voltage generated by the capacitor 242 is applied to the first electrode 31 and hence the inflammable fuel-air mixture combusts. However, in the cylinder resting mode (fuel injection stopped) mode, there exists no ion produced by the combustion; thus, no ion current is generated. Accordingly, as represented in FIG. 4A, only the noise currents N1, N2, and N3 are detected by the ion current detection circuit 203.

Next, the case where a leakage is produced in the ignition plug 3 will be explained. FIG. 8 is an explanatory view for explaining a leakage in an ignition plug of an internal combustion engine. In the cases where as illustrated in FIG. 8, a conductive material is adhered to the ignition plug 3 and the short-circuiting or the like between the first electrode 31 and a mounting bracket 36 or the second electrode 32 whose electric potential is maintained at the ground potential reduces the insulating resistance value, an electric charge leaks from the capacitor 242 that is charged up to the foregoing bias voltage; as represented in after-mentioned FIGS. 4B and 4C, a leakage current IL is produced by the leakage electric charge; the ion current detection circuit 203 detects the leakage current IL as an ion current.

In the foregoing cylinder resting drive, the intake valve 4 and the exhaust valve 5 of a resting cylinder are fully closed in order to reduce the intake/exhaust loss of the internal combustion engine, i.e., the pumping loss thereof; therefore, in the vicinity of the bottom dead center of the piston 40, the pressure becomes largely negative; thus, there occurs an oil rising instance in which oil or the like intrudes into the cylinder liner 101 from a crankcase 51. In the case where as illustrated in FIG. 8, the oil rising causes metal powder, soot, oil including conductive material such as water, or the like to be adhered to the ignition plug 3, the leakage path 34 is formed on the ignition plug 3 and hence a leakage occurs. At the beginning stage of the leakage occurrence, a leakage current occurs for a short time in the vicinity of the bottom dead center of the piston 40; the level of the leakage current is low. However, as the degree of the leakage increases, the level of the leakage current is likely to be enlarged and the leakage tends to occur for a long time. The reason for the above tendency is that because as illustrated in FIG. 8, oil or the like is accumulated with time in the depths of the gap between an insulator 33 of the ignition plug 3 and the mounting bracket 36 and hence an oil pool 35 is formed, the leakage path 34 is likely to be maintained.

The dielectric breakdown voltage of the ignition plug 3 depends on the atmospheric pressure, as known in the Paschen's law, and is in proportion to the pressure. In other words, as represented in FIG. 4D, in the case where the inner-cylinder pressure is low, for example, a negative pressure, a dielectric breakdown is liable to occur even when the voltage across the first electrode 31 and the second electrode 32 is low; therefore, an ignition-signal-on induction voltage (maximum 1 kV or so), generated across the secondary coil 22 at the time instant t1 at which the ignition signal is switched from L Level to H Level, may cause an ignition discharge in the ignition plug 3. In FIG. 4D, although no leakage has been caused in the ignition plug 3, a discharge current ID has occurred in the interval from the time instant t1 to a time instant t11, due to the ignition-signal-on induction voltage; thus, the discharge current ID is detected by the ion current detection circuit 203. Accordingly, it is required to distinguish a leakage current from the discharge current ID that flows, due to the ignition-signal-on induction voltage, in the interval from the time instant t1 to the time instant t11.

Accordingly, in the internal combustion engine leakage detection apparatus according to Embodiment 1 of the present invention, as represented in FIG. 4B, the ignition control unit 201 of the ECU 1 makes the ignition signal rise to H Level at the time instant t1 at which the inner-cylinder pressure is the one with which no ignition discharge is caused by the value of the ignition-signal-on induction voltage. The time instant t1 in FIG. 4B is a timing at which the crank angle is in the vicinity of approximately 50°; the inner-cylinder pressure is, for example, in the range from 180 KPa to 200 KPa. At this inner-cylinder pressure, no ignition discharge is caused by the value of the ignition-signal-on induction voltage. The value of the inner-cylinder pressure at which no ignition discharge is caused by the value of the ignition-signal-on induction voltage can preliminarily be obtained from an experiment or the like.

When as described above, the ignition signal is switched from L Level to H Level at the time instant t1 at which the inner-cylinder pressure is the one with which no ignition discharge is caused by the value of the ignition-signal-on induction voltage, no ignition discharge is caused by the ignition-signal-on induction voltage even when the ignition-signal-on induction voltage is applied between the first electrode 31 and the second electrode 32 of the ignition plug 3, because the inner-cylinder at the time instant t1 is relatively high; therefore, the discharge current ID represented in FIG. 4D does not flow. Then, at a time instant tb corresponding to the vicinity of the bottom dead center of the piston 40, the inner-cylinder pressure becomes the most negative pressure; however, because the secondary voltage, which is an induction voltage introduced across the secondary coil has already decreased at the time instant tb, no ignition discharge is caused even at the time instant tb and hence the discharge current ID represented in FIG. 4D does not flow.

As represented in FIG. 4B, at the time instant tb at which the piston 40 is at the vicinity of the bottom dead center, the inner-cylinder pressure becomes an approximately most negative pressure and hence oil rising is suddenly caused; thus, the ignition plug 3 is contaminated and the leakage path 34 may be suddenly formed. Because as described above, the secondary voltage generated in the interval from the time instant t1 to the time instant t2 is applied between the first electrode and the second electrode of the ignition plug 3, the secondary voltage makes a leakage current IL flow in the leakage path 34, which is suddenly formed in the ignition plug 3, and the leakage current IL is detected by the ion current detection circuit 203. In this case, as described above, no ignition discharge is caused; therefore, it is clearly determined that the current detected by the ion current detection circuit 203 is not the discharge current ID but the leakage current IL.

The cylinder 100 is in the resting cylinder mode and hence the fuel injection is stopped; therefore, even if a dielectric breakdown is caused in the opposing gap of the ignition plug 3 and an ignition discharge occurs, combustion is not performed. Thus, the time instant t2, which is an ignition timing, can arbitrarily be set.

In the internal combustion engine leakage detection apparatus according to Embodiment 1 of the present invention, as represented in FIG. 4B, the secondary voltage, which is a voltage higher than the bias voltage (a constant voltage of as high as 100 V) applied through the charging voltage across the capacitor 242, can be applied to the first electrode 31 of the ignition plug 3; therefore, even when its level is low, the leakage current can securely be detected. Accordingly, the leakage current can be detected at an early stage where due to oil rising or the like, the leakage path 34 starts to be formed in the ignition plug 3; therefore, it is made possible that when the contamination of the ignition plug 3 is prevented by purifying the ignition plug 3 or by prohibiting the cylinder resting from being continued, a misfire at a time when the normal drive is restored from the cylinder resting drive is prevented.

In the case where the energization duration of the ignition signal is long, i.e., the time period in which the ignition signal is H Level is long and hence the ignition coil device 2 and the like may generate heat, it is only necessary to apply a bias voltage (as high as 100 V), replacing the secondary voltage, to the ignition plug 3 after ignition discharge has ended and making the ion current detection circuit 203 detect the leakage current. As is clear from an experiment or the like, even when the inner-cylinder pressure is a large negative voltage, a constant voltage of as high as 100 V hardly causes a dielectric breakdown between the electrodes of the ignition plug 3.

That is to say, in the case where a constant bias voltage of as high as 100 V is applied to the ignition plug 3 after ignition discharge has ended and then the ion current detection circuit 203 detects a leakage current, at first, at the time instant t3 at which the crank angle is in the vicinity of 270° or at a time instant at which the crank angle is behind the bottom dead center of the piston 40, the ignition signal is switched from L Level to H Level so as to be on; after that, the ignition signal is switched from H Level to L Level so as to be off and then the ignition voltage is applied to the ignition plug 3 so that an ignition discharge is caused; then, by use of the bias voltage that is applied to the ignition plug 3 through the capacitor 242 when the ignition signal is L Level, a leakage current is detected. The operation in this case will be explained with reference to FIG. 4C.

In other words, FIG. 4C represents the case where the bias voltage is applied to the ignition plug after ignition discharge has ended and then the ion current detection circuit detects a leakage current. As represented in FIG. 4C, at the time instant t1 that is behind the time instant tb corresponding to the bottom dead center of the piston 40, the ignition signal is switched from L Level to H Level; at the time instant t2 at which the crank angle is after and including 270°, the ignition signal is switched from H Level to L Level. In the ignition plug 3, ignition discharge occurs at the time instant t2; however, because the cylinder 100 is a resting cylinder and hence no fuel is supplied thereto, no ion is produced by ignition discharge at the time instant t2. However, after the ignition discharge that has occurred at the time instant t2, the bias voltage through the capacitor 242 is applied to the first electrode 31 of the ignition plug 3 in the interval from the time instant t3 to the time instant t1 in the next rotation cycle of the crankshaft 50; therefore, the ion current detection circuit 203 can detect the leakage power IL caused by leakage that suddenly occurs at a timing at which the inner-cylinder pressure becomes the maximum negative voltage in the vicinity of the bottom dead center of the piston 40.

In the case of the operation represented in FIG. 4C, unlike the operation represented in FIG. 4B, the secondary voltage, which is an induction voltage at a time after the ignition signal has turned on, is not applied to the ignition plug 3 for a long time; therefore, heat generation by the ignition coil device 2 and the like can be suppressed.

The leakage current IL, detected by the ion current detection circuit 203 in accordance with the operations represented in FIGS. 4B and 4C, is amplified and then is transferred to the signal reception unit 204 in the ECU 1; then, the plug status detection unit 205 determines whether or not leakage has occurred in the ignition plug 3.

Figure 5A:
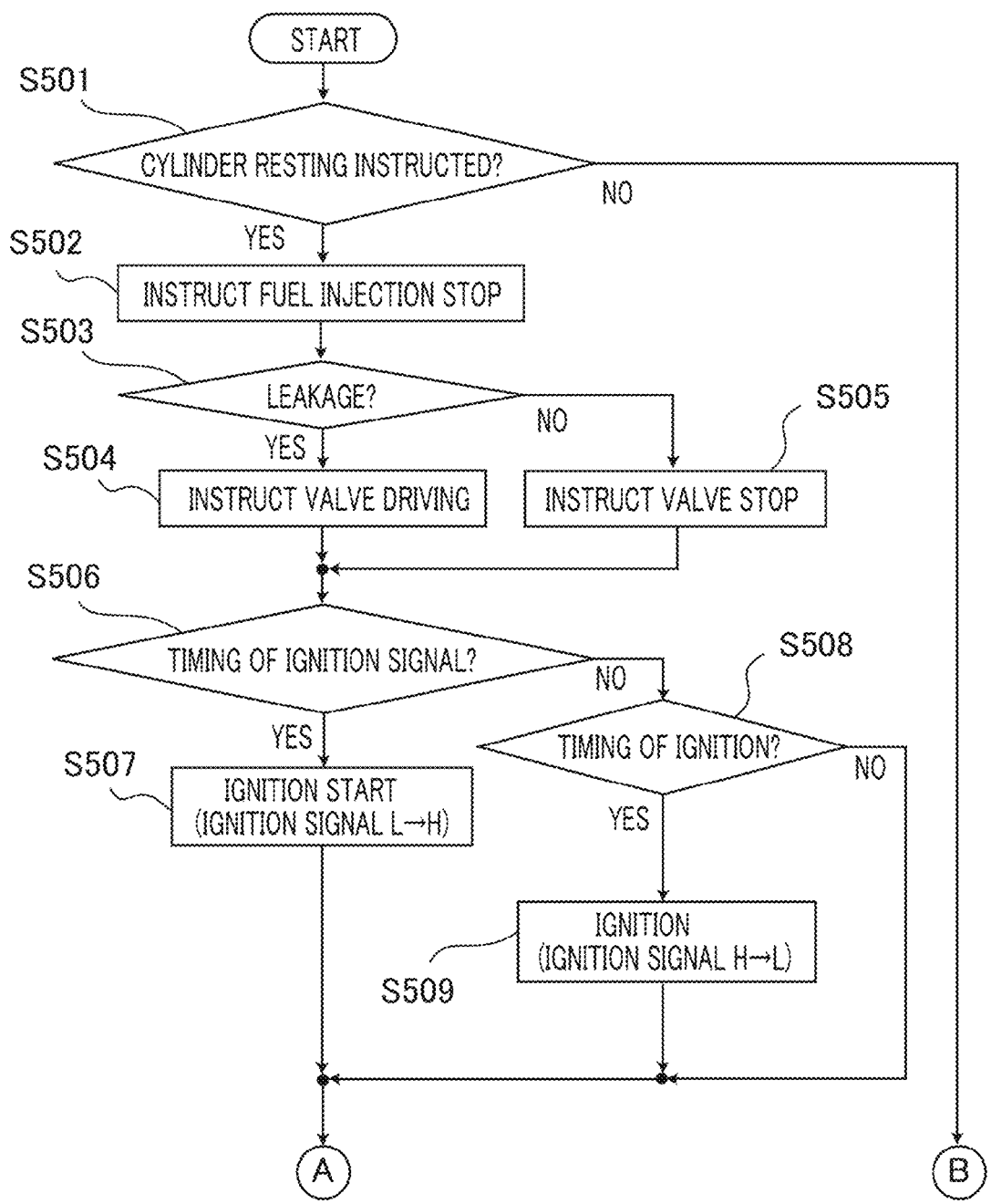
FIG. 5 (consisting of FIGS. 5A and 5B) is a flowchart representing the operation of the internal combustion engine leakage detection apparatus according to Embodiment 1 of the present invention.
Figure 5B:
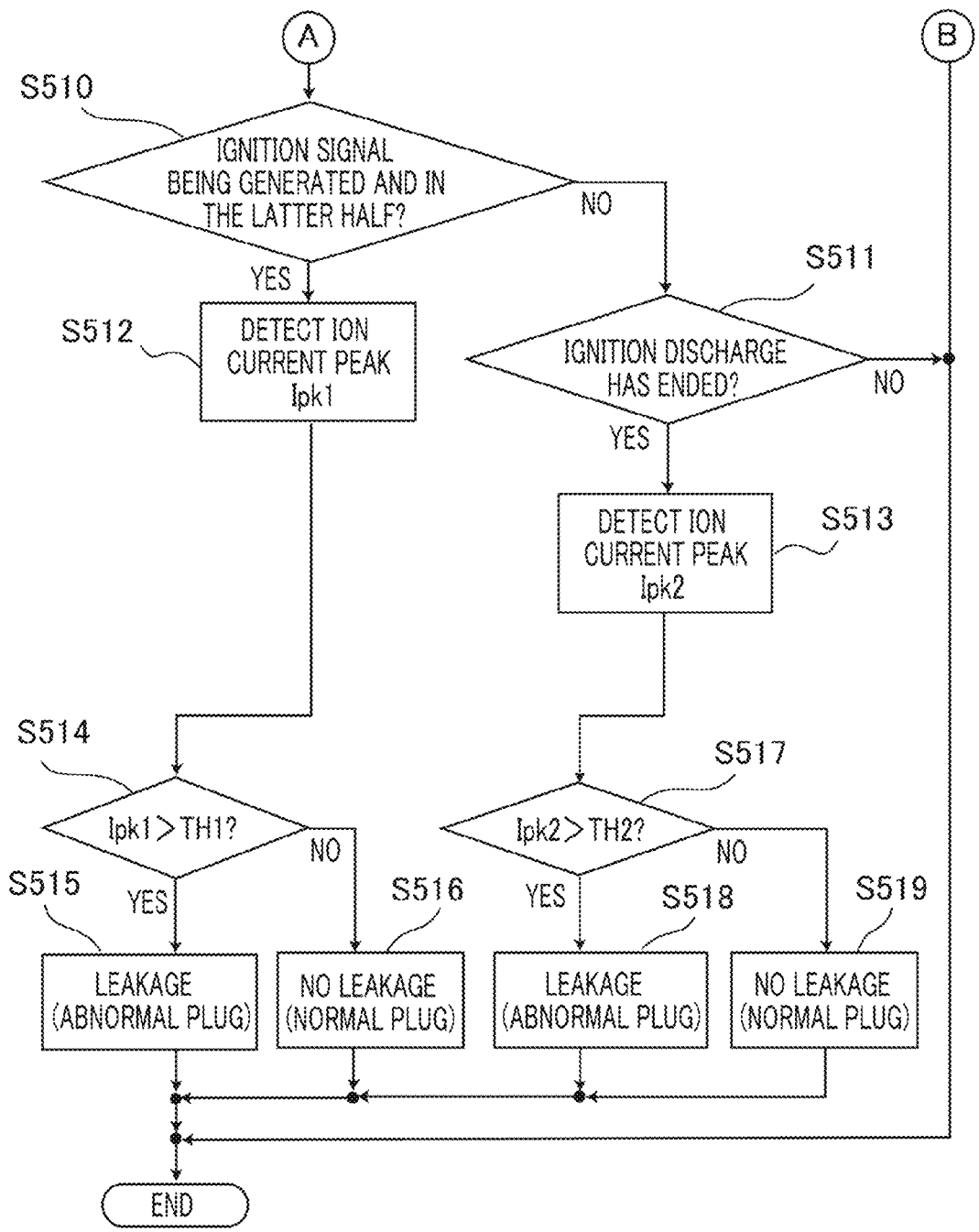

Next, the specific operation of the internal combustion engine leakage detection apparatus according to Embodiment 1 of the present invention will be explained. FIG. 5 (consisting of FIGS. 5A and 5B) is a flowchart representing the operation of the internal combustion engine leakage detection apparatus according to Embodiment 1 of the present invention; the operation is repeated every predetermined time. In FIG. 5, at first, it is determined in the step S501 whether or not the cylinder resting drive has been instructed. Whether or not the cylinder resting drive is to be performed is basically determined by the conditions such as the rotation speed of the internal combustion engine, the load condition, the oil temperature, and the water temperature. In the case where in the step S501, it is determined that the cylinder resting drive has been instructed (YES), the step S501 is followed by the step S502. In the step S502, the fuel-injection stop instruction is issued so that fuel injection by the fuel injection valve 6 is stopped; then, the step S502 is followed by the step S503.

Although the details will be described later, in the step S503, it is determined whether the status of the ignition plug 3, stored in the ECU 1, is the status of leakage or no leakage. As the information on the ignition plug 3 on which determination is performed, the information indicating the status of the ignition plug 3, stored before the present time instant, is utilized. In the case where in the step S503, it is determined that there has been leakage in the ignition plug 3 (YES), the step S503 is followed by the step S504, where drive of the intake valve 4 and the exhaust valve 5 is instructed; then, the ignition plug is purified. It may be allowed that this processing is performed in the case where the status indicating that leakage exists in the ignition plug 3 continues for a predetermined cycles. In contrast, in the case where in the step S503, it is determined that there exists no leakage in the ignition plug 3 (NO), the step S503 is followed by the step S505, where stopping of the intake valve 4 and the exhaust valve 5 is instructed. The step S506 is followed by either one of the foregoing processing items.

Although as it has been determined in the step S501, the cylinder resting drive is being instructed at the present time instant, ignition by the ignition plug 3 is implemented in order to detect whether or not there exists leakage. For that purpose, in the step S506, it is determined whether or not the present time instant is a crank-angle timing at which the inner-cylinder pressure is a pressure, obtained by an experiment or the like, with which the ignition-signal-on induction voltage causes no ignition discharge. In the case where in the step S506, it is determined that the present time instant is a crank-angle timing at which the inner-cylinder pressure is a pressure at which the ignition-signal-on induction voltage causes no ignition discharge (YES), the step S506 is followed by the step S507, where the ignition signal is switched from L Level to H Level so that ignition is started (at the time instant t1 in FIG. 4B). As a result, at the time instant t1, the ignition-signal-on induction voltage causes no ignition discharge. Furthermore, as explained with reference to FIG. 4B, no ignition discharge is caused also at the time instant tb in the vicinity of the bottom dead center of the piston 40, in which oil rising is liable to occur; therefore, because the ignition-signal-on induction voltage produces no discharge current, it is made possible to detect only the leakage current IL; thus, the status of the ignition plug can accurately be determined.

After the foregoing process has been implemented or in the case where in the step S506, it is determined that the present time instant is not a crank-angle timing at which the inner-cylinder pressure is a pressure at which the ignition-signal-on induction voltage causes no ignition discharge (NO), the step S506 is followed by the step S508. In the step S508, it is determined whether or not the present time instant is a crank-angle timing at which the ignition signal stops, i.e., a timing of ignition discharge. As described above, in the latter half of the period, including the time instant tb in the vicinity of the bottom dead center, in which the ignition signal is H Level, the secondary voltage generated across the secondary coil 21 is applied to the ignition plug 3; however, this secondary voltage causes no ignition discharge in the ignition plug 3.

In the case where in the step S508, it is determined that the present time instant is a crank-angle timing at which the ignition signal stops (YES), the step S508 is followed by the step S509, where the ignition signal is switched from H Level to L Level (at the time instant t2 in FIG. 4B). As a result, the switching device 250 turns off and hence a negative-polarity high-voltage ignition voltage is generated across the secondary coil 33; then, an ignition voltage higher than the bias voltage (as high as 100 V) is applied to the ignition plug 3 at the time instant tb in the vicinity of the bottom dead center of the piston 40, at which oil rising is liable to occur; thus, the detection sensitivity to a leakage current is raised. After the foregoing process has been implemented or in the case where in the step S508, it is determined that the present time instant is not a crank-angle timing corresponding to a timing at which the ignition signal is stopped (NO), the step S508 is followed by the step S5108.

Although not represented in the drawing, it may be allowed that each of the foregoing ignition signal generation processing (switching from L Level to H Level) and ignition signal ending processing (switching from H Level to L Level) is performed at both the intake bottom dead center and the expansion bottom dead center, i.e., twice per one cycle of the internal combustion engine. As a result, the opportunity for detecting the contamination status of the ignition plug 3 increases and hence contamination of the ignition plug can more quickly be detected.

Next, in the step S501, it is determined whether or not the present time instant is a timing at which the crank angle is the one at which the ignition signal is being generated (the ignition signal is H Level) and in the latter half of the ignition signal (after and including the time instant tb in FIG. 4B); then, in the case where the condition is established (YES), the step S501 is followed by the step S512. In contrast, in the case where it is determined in the step S510 that the condition is not established (NO), the step S510 is followed by the step S511, where it is determined whether or not the present time instant is a timing at which the crank angle is the one at a time after ignition discharge has ended. The ignition discharge duration is the time period from the ignition timing (the time instant t2 in FIG. 4B) to the timing (the time instant t3 in FIG. 4B) at which the noise current N3 produced by the LC resonance. Accordingly, in the step S511, the timing after the noise current N3 produced by the LC resonance has been detected is determined as being after ignition discharge. In the case where in the step S511, it is determined that the present time instant is after ignition discharge (YES), the step S511 is followed by the step S513.

Because as described above, having received the ion current signal detected by the ion current detection circuit 203 through the signal reception device 204, the ECU 1 obtains an ion current peak value Ipk2 from the received ion current signal in the step S513. In this regard, however, what is obtained is not limited to the ion current peak value, and an ion current integration value may be utilized. Because short-time noise enlarges the ion current peak value, it is made possible to prevent the ion current signal from being erroneously detected.

Next, in the step S517, it is determined whether or not the ion current peak value Ipk2 is larger than a leakage determination threshold value TH2; in the case where the ion current peak value Ipk2 is larger than the leakage determination threshold value TH2 (YES), the fact that there exists leakage in the ignition plug 3 (abnormal plug) is stored in the step S518, and then the processing is ended; in the case where the ion current peak value Ipk2 is smaller than the leakage determination threshold value TH2 (NO), the fact that there exists no leakage in the ignition plug 3 (normal plug) is stored in the step S519, and then the processing is ended.

Meanwhile, in the case where the step S510 is followed by the step S512, because as described above, having received the ion current signal detected by the ion current detection circuit 203 through the signal reception device 204, the ECU 1 obtains an ion current peak value Ipk1 from the received ion current signal in the step S512. In this regard, however, what is obtained is not limited to the ion current peak value, and an ion current integration value may be utilized. Because short-time noise enlarges the ion current peak value, it is made possible to prevent the ion current signal from being erroneously detected.

Next, in the step S514, it is determined whether or not the ion current peak value Ipk1 is larger than a leakage determination threshold value TH1; in the case where the ion current peak value Ipk1 is larger than the leakage determination threshold value TH1 (YES), the condition that there exists leakage in the ignition plug 3 (abnormal plug) is stored in the step S515, and then the processing is ended; in the case where the ion current peak value Ipk1 is smaller than the leakage determination threshold value TH1 (NO), the condition that there exists no leakage in the ignition plug 3 (normal plug) is stored in the step S516, and then the processing is ended.

Although not represented in the drawing, it may be allowed that an insulating resistance value RL*(=Vpk*/Ipk*) is calculated from the ion current peak value Ipk1 and the value Vpk1 of a voltage applied to the ignition plug 3 and it is determined that there exists leakage when the insulating resistance value RL*(=Vpk*/Ipk*) is smaller than a predetermined threshold value. Similarly, it may be allowed that an insulating resistance value RL*(=Vpk*/Ipk*) is calculated from the ion current peak value Ipk2 and the value Vpk2 of a voltage applied to the ignition plug 3 and it is determined that there exists leakage when the insulating resistance value RL*(=Vpk*/Ipk*) is smaller than the predetermined threshold value.

The voltage value Vpk1 is the secondary voltage at the time instant tb in FIG. 4B and is estimated from the relationship between a secondary voltage obtained from a preliminary experiment and the time instant t1 at which the ignition signal is switched from L Level to H Level. The voltage value Vpk2 is the secondary voltage at the time instant t3 in FIG. 4B and is the foregoing bias voltage (as high as 100 V) that is applied after ignition discharge. It may be allowed that in the case where the difference between the insulating resistance value RL2 at the time instant tb corresponding to the bottom dead center and the insulating resistance value RL1 at the time instant after the bottom dead center is large, the condition that there exists instantaneous leakage at the time instant tb corresponding to the bottom dead center at which oil rising is liable to occur (starting stage of plug contamination) is stored and that in the case where the difference between the insulating resistance value RL2 and the insulating resistance value RL1 is small, the condition that there exists continual leakage (progression of plug contamination) is stored.

In the foregoing step S503, whether or not there exists leakage in the ignition plug 3 is determined based on the information indicating the status of the ignition plug 3, stored in such a manner as described above; then, in the step S504, valve driving is instructed so that the ignition plug is purified. It may be allowed that in the case where the ion current peak value is large (the insulating resistance value is small) and plug contamination is in progress, the valve drive cycle is set to be long. As a result, the effect of purifying the plug is enlarged.

It may be allowed that based on the stored information indicating the status of the ignition plug 3, it is determined in the step S501 whether or not the instruction of continuing the cylinder resting is issued. When based on the ion current peak value or the insulating resistance value, the cylinder resting is not instructed in the starting stage of contamination of the ignition plug 3, the contamination progression of the ignition plug 3 can be prevented. This determination makes it possible that it is not required to preliminarily set the cylinder resting duration to be short; thus, the cylinder resting duration can be set long and hence the gasoline mileage can be improved.

In the foregoing internal combustion engine leakage detection apparatus according to Embodiment 1 of the present invention, as described above, in the cylinder resting drive mode, the secondary voltage, with which no ignition discharge is caused even at the timing, like a timing in the vicinity of the bottom dead center of the piston 40, at which the negative pressure in the resting cylinder becomes large, is applied to the ignite plug 3; therefore, no discharge current is erroneously detected as a leakage current and hence it is made possible to accurately detect an abnormality in the status of the ignition plug of the internal combustion engine provided with a cylinder resting function.

Moreover, in the internal combustion engine leakage detection apparatus according to Embodiment 1 of the present invention, as represented in FIG. 4B, the secondary voltage, which is a voltage higher than the bias voltage (a constant voltage of as high as 100 V) applied through the charging voltage across the capacitor 242, can be applied to the first electrode 31 of the ignition plug 3; therefore, even when its level is low, the leakage current can securely be detected. Accordingly, the leakage current can be detected at an early stage where due to oil rising or the like, the leakage path 34 starts to be formed in the ignition plug 3; therefore, it is made possible that when the contamination of the ignition plug 3 is prevented by purifying the ignition plug 3 or by prohibiting the cylinder resting from being continued, a misfire at a time when the normal drive is restored from the cylinder resting drive is prevented.

Moreover, in the internal combustion engine leakage detection apparatus according to Embodiment 1 of the present invention, as represented in FIG. 4B, the ignition control unit 201 turns the ignition signal to H Level (at the time instant t1) at an inner-cylinder pressure that is obtained from a preliminary experiment or the like and with which the ignition-signal-on induction voltage causes no ignition discharge; therefore, no discharge current caused by the ignition-signal-on induction voltage is erroneously detected as a leakage current and hence it is made possible to accurately detect an abnormality in the status of the ignition plug of the internal combustion engine provided with a cylinder resting function.

Still moreover, in the internal combustion engine leakage detection apparatus according to Embodiment 1 of the present invention, when as represented in FIG. 4C, the leakage condition is detected based on the output signal of the ion current detection circuit 203 at a time after ignition discharge has ended (after the time instant t3 in FIG. 4C), no discharge current caused by the ignition-signal-on induction voltage is erroneously detected as a leakage current and hence it is made possible to detect the leakage condition in a wide range in the vicinity of the bottom dead center of the piston.

Moreover, in the internal combustion engine leakage detection apparatus according to Embodiment 1 of the present invention, the ignition control unit 201 can perform each of the ignition signal generation processing and the ignition signal ending processing at both the intake bottom dead center and the expansion bottom dead center (i.e., twice per one cycle of the combustion stroke of the internal combustion engine); therefore, the opportunity for detecting the plug status increases and hence contamination of the ignition plug can more quickly be detected.

Moreover, in the internal combustion engine leakage detection apparatus according to Embodiment 1 of the present invention, when the leakage condition is detected based on the peak value of the output signal of the ion current detection circuit 203, it is made possible to calculate the foregoing insulating resistance value in addition to detecting whether or not leakage exists.

Moreover, in the internal combustion engine leakage detection apparatus according to Embodiment 1 of the present invention, when the leakage condition is detected based on the integration value of the output signal of the ion current detection circuit 203, it is made possible to prevent leakage from being erroneously detected because short-time noise enlarges the peak value of an ion current.

Still moreover, in the internal combustion engine leakage detection apparatus according to Embodiment 1 of the present invention, the cylinder resting control unit 206 drives the intake valve 4 and the exhaust valve 5 when the plug status detection unit 205 determines that leakage exists, so that the leakage in the ignition plug 3 can be purified; therefore, it is made possible to prevent the progression of ignition-plug contamination and a misfire at a time when the cylinder resting is cancelled.

Moreover, in the internal combustion engine leakage detection apparatus according to Embodiment 1 of the present invention, the cylinder resting control unit 206 determines the contamination condition of the ignition plug based on the peak value of an ion current and the insulating resistance value, and issues no instruction for the cylinder resting at the starting stage of ignition-plug contamination, so that the progression of plug contamination can be prevented; furthermore, the determination makes it possible that it is not required to preliminarily set the cylinder resting duration to be short; thus, the cylinder resting duration can be set long and hence the gasoline mileage can be improved.

Moreover, in the internal combustion engine leakage detection apparatus according to Embodiment 1 of the present invention, because the ion current detection circuit 203 is provided, it is made possible to detect an ion current produced at a time of combustion so as to detect the combustion condition when the cylinder resting is not being instructed.

Embodiment 2

In Embodiment 1, by mainly adjusting the generation timing and the ending timing of the ignition signal and the detection timing of an ion current, a discharge current produced by the ignition-signal-on induction voltage is prevented from being erroneously detected as a leakage current; however, in an internal combustion engine leakage detection apparatus according to Embodiment 2 of the present invention, in the case where the ion current peak value at a time when the ignition signal is generated is smaller than a discharge threshold value TH3 and larger than the leakage determination threshold value TH1, it is determined that leakage exists. The other configurations and the contents of processing items are the same as those in Embodiment 1.

Figure 6A:
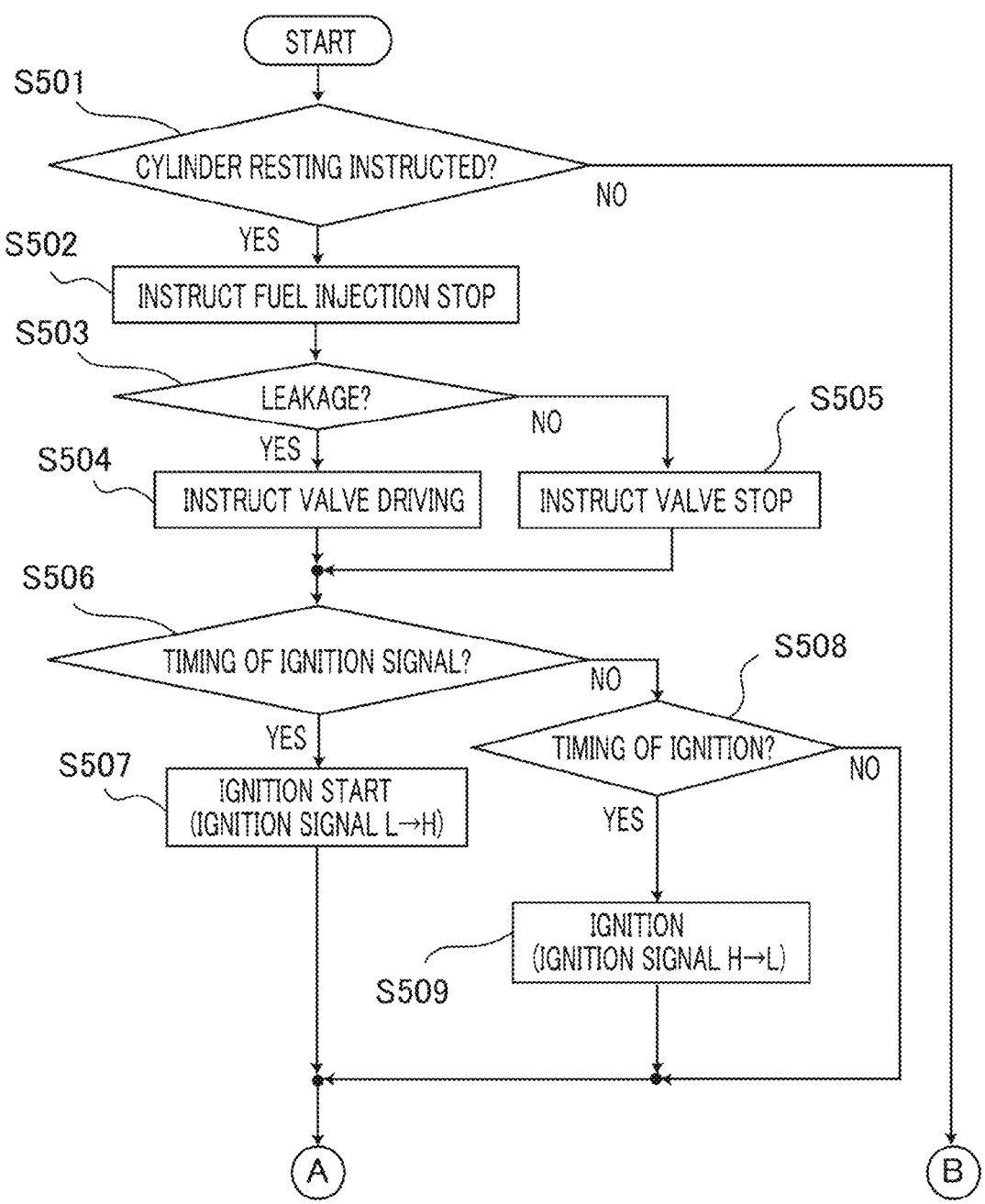
FIG. 6 (consisting of FIGS. 6A and 6B) is a flowchart representing the operation of the internal combustion engine leakage detection apparatus according to Embodiment 2 of the present invention.
Figure 6B:
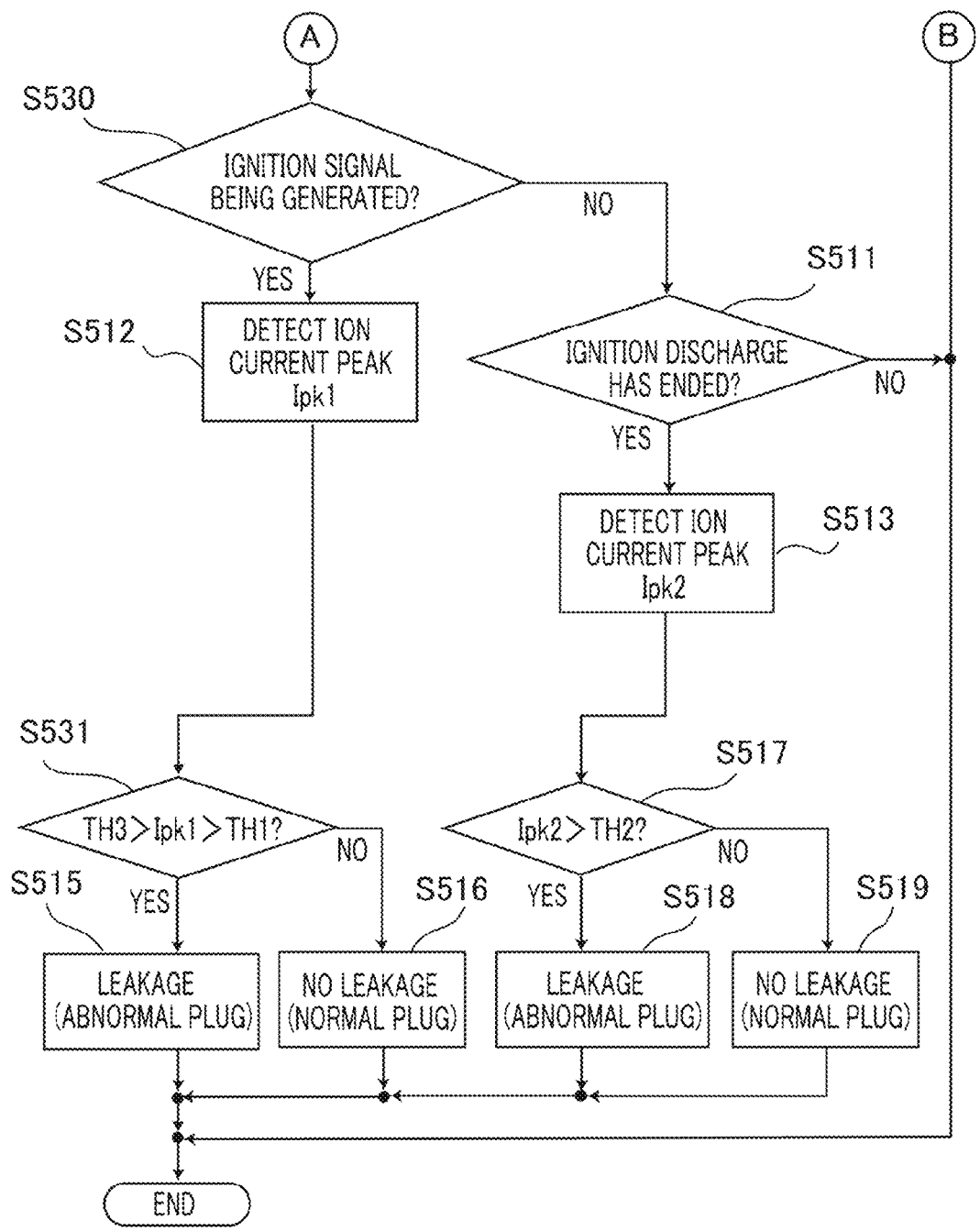

FIG. 6 (consisting of FIGS. 6A and 6B) is a flowchart representing the operation of the internal combustion engine leakage detection apparatus according to Embodiment 2 of the present invention. The basic flow is the same as that in the flowchart represented in FIG. 5 according to Embodiment 1; however, the steps S530 and S531 in the flowchart represented in FIG. 6 are different from the corresponding steps in the flowchart represented in FIG. 5. In FIG. 6, it is determined in the step S530 whether or not the ignition signal is being generated; in the case where the ignition signal is being generated (YES), the step S530 is followed by the step S512, where the ion current peak value Ipk1 is detected.

Figure 4E:
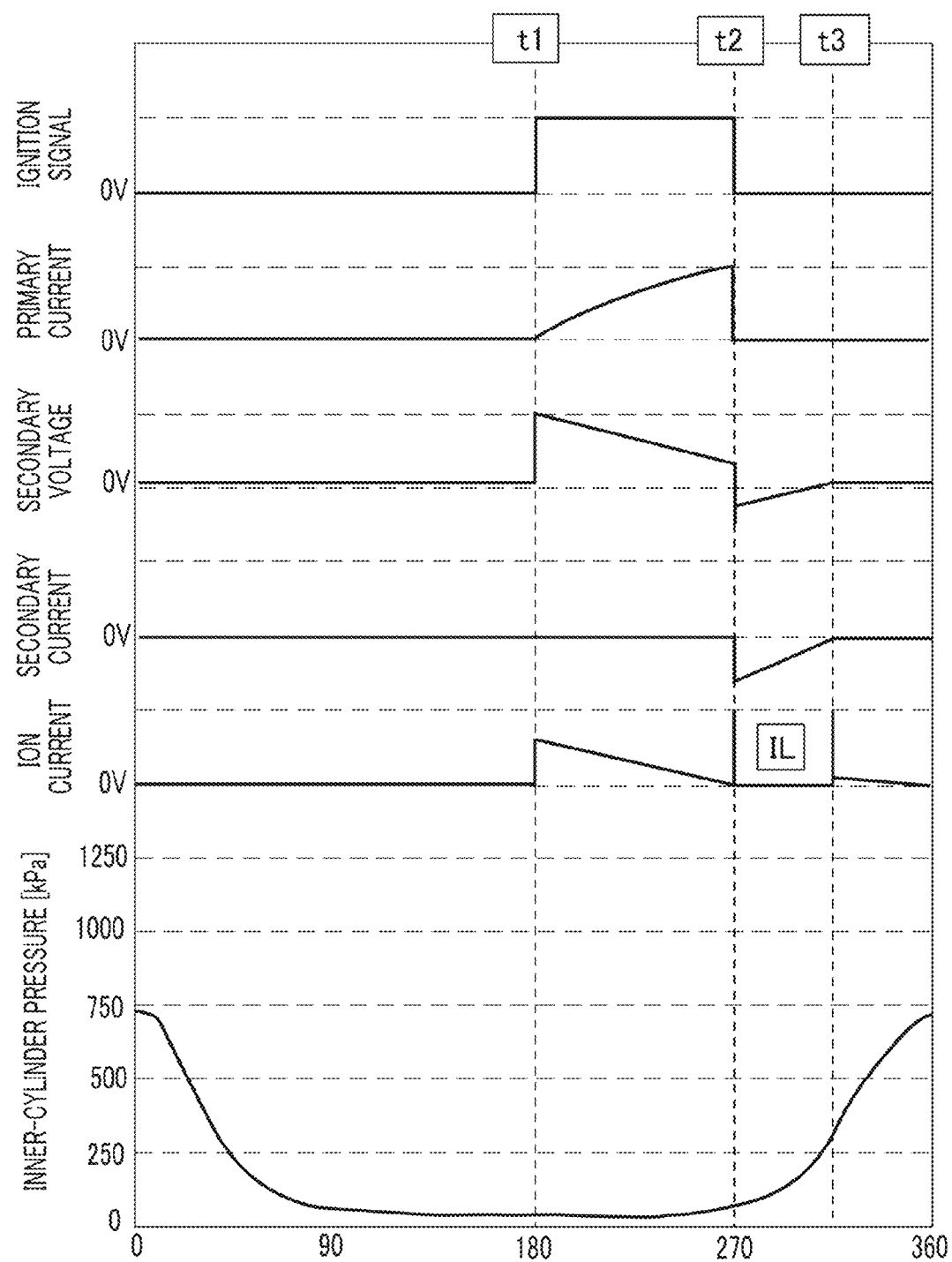
FIG. 4E is a timing chart for explaining the operation of a leakage detection apparatus of an internal combustion engine leakage detection apparatus according to Embodiment 2 of the present invention.

FIG. 4E is a timing chart for explaining the operation of a leakage detection apparatus of the internal combustion engine leakage detection apparatus according to Embodiment 2 of the present invention. The insulating resistance value, of the ignition plug, from which the insulating resistance value of the ignition plug starts to provide an effect to a misfire is 10 MΩ; therefore, as represented in FIG. 4E, assuming that the ignition-signal-on induction voltage at the time instant t1 is 1 kV, the leakage current IL that flows in the ignition plug is given by the following equation.

$$IL=1 \text{ [kV]}/10 \text{ [M}\Omega\text{]}=0.1 \text{ [mA]}$$

In contrast, as represented in FIG. 4D, the ignition-signal-on induction voltage at a time instant t1 generates the discharge current IL of 1 mA to 5 mA. Accordingly, in the case where in the step S531, the ion current peak value Ipk1 is smaller than a discharge threshold value TH3 (e.g., 1 mA) at a time when the ignition signal is on and is larger than the leakage determination threshold value TH1 (e.g., 0.1 mA) (YES), it is determined in the step S515 that there exists leakage; in the case where the condition is not satisfied (NO), it is determined in the step S516 that there exists no leakage (normal plug).

In the foregoing internal combustion engine leakage detection apparatus according to Embodiment 2 of the present invention, because detecting the leakage condition of the ignition plug when the peak value of the output signal of the ion current detection circuit 203 at a time when the ignition signal is being generated is the same as or smaller than a predetermined value, the plug status detection unit 205 does not erroneously detect a discharge current produced by the ignition-signal-on induction voltage as a leakage current; therefore, it is made possible to set the time instant t1 at which the ignition signal is generated to a timing, in the vicinity of the bottom dead center of the piston 40, at which oil rising is liable to occur; thus, a leakage condition can be detected even at a lower level of the leakage current.

Embodiment 3

In each of Embodiments 1 and 2, based on the peak value or the integration value of an ion current, it has been determined whether or not there exists leakage in the ignition plug; however, in Embodiment 3, the ignition discharge duration is also utilized for determining whether or not there exists leakage. The other configurations and the contents of processing items are the same as those in Embodiment 1.

Figure 4F:
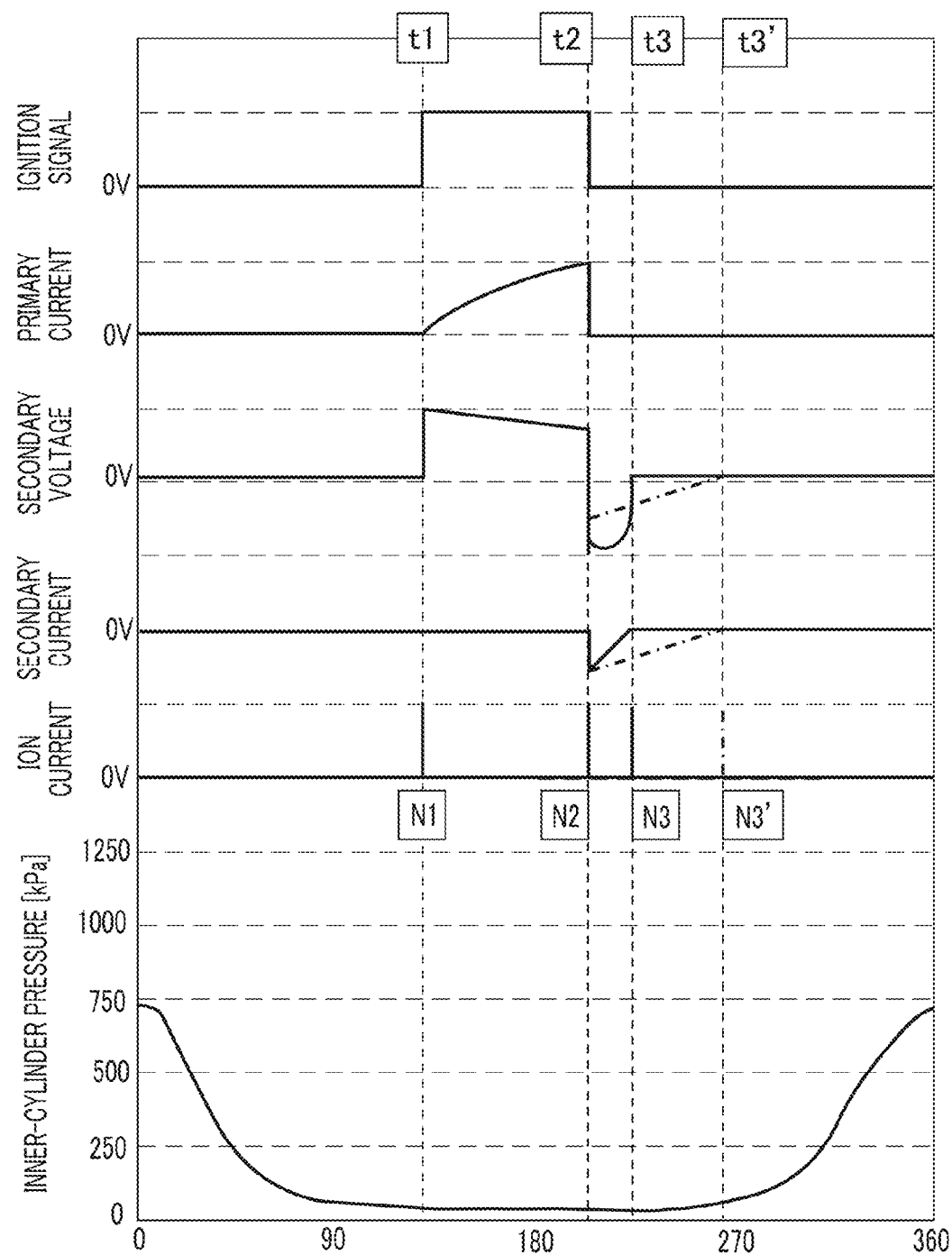
FIG. 4F is a timing chart for explaining the operation of a leakage detection apparatus of an internal combustion engine leakage detection apparatus according to Embodiment 3 of the present invention.

FIG. 4F is a timing chart for explaining the operation of a leakage detection apparatus of the internal combustion engine leakage detection apparatus according to Embodiment 3 of the present invention. A liquid droplet or the like caused by oil rising may change the discharging path between the first electrode 31 and the second electrode 32 of the ignition plug 3; for example, the discharging path may become longer. In FIG. 4F, in the case where no oil rising is caused, the secondary voltage and the secondary current at a time after ignition discharge change as represented by the respective one-dot chain lines; however, in the case where oil rising is caused and hence the discharging path becomes longer, the secondary voltage and the secondary current at a time after ignition discharge change as represented by the respective solid lines. When the discharging path becomes longer, the ignition voltage (secondary voltage)—the solid line—is higher than the ignition voltage (secondary voltage)—the one-dot chain line. As a result, because the energy to be accumulated in the ignition coil device 2 is the same, the ignition discharge duration (t2 to t3) at a time when oil rising is caused and hence the discharging path is longer becomes shorter than the ignition discharge duration (t2 to t3') at a time when no oil rising is caused.

Figure 7A:
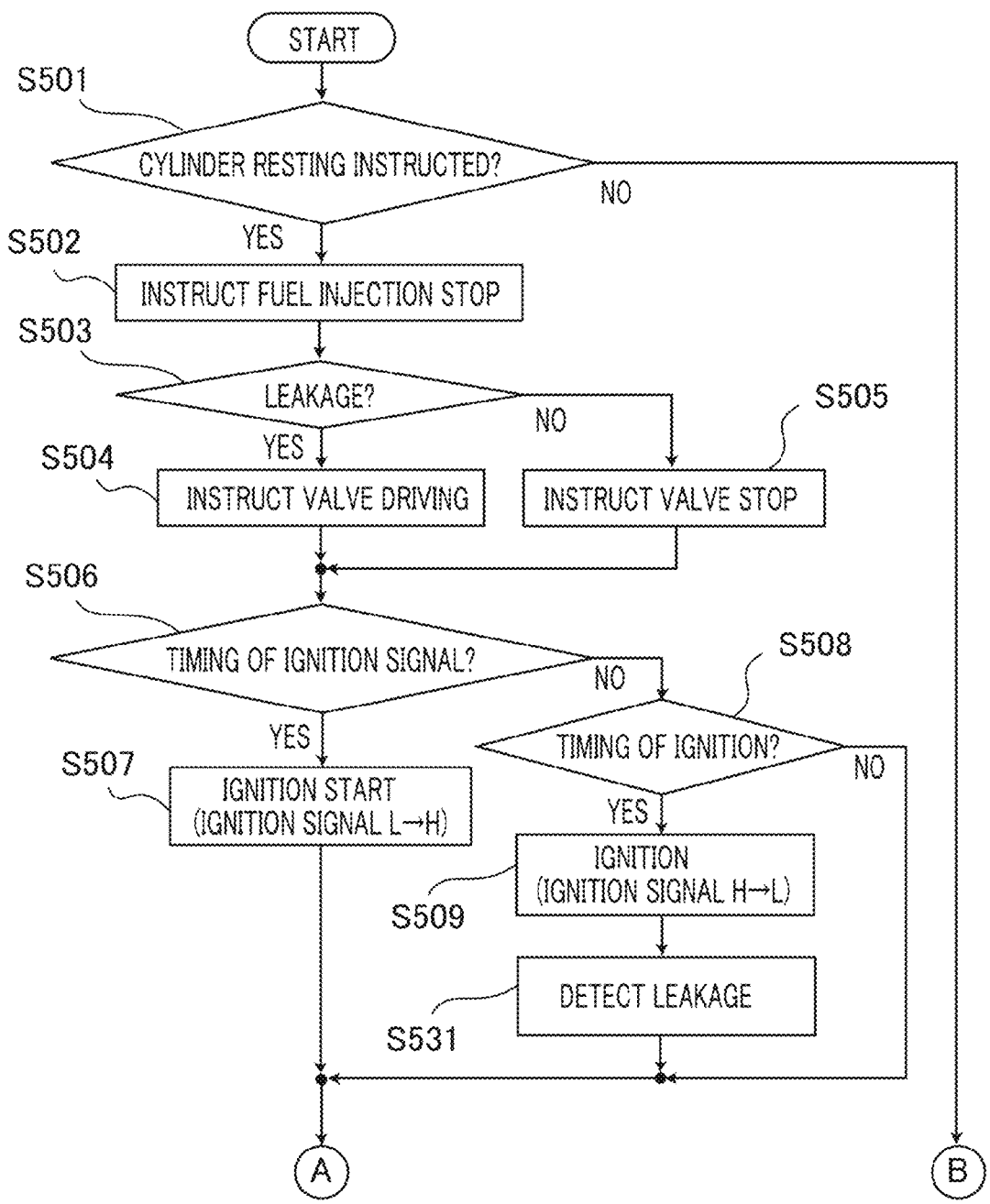
FIG. 7 (consisting of FIGS. 7A and 7B) is a flowchart representing the operation of the internal combustion engine leakage detection apparatus according to Embodiment 3 of the present invention.
Figure 7B:
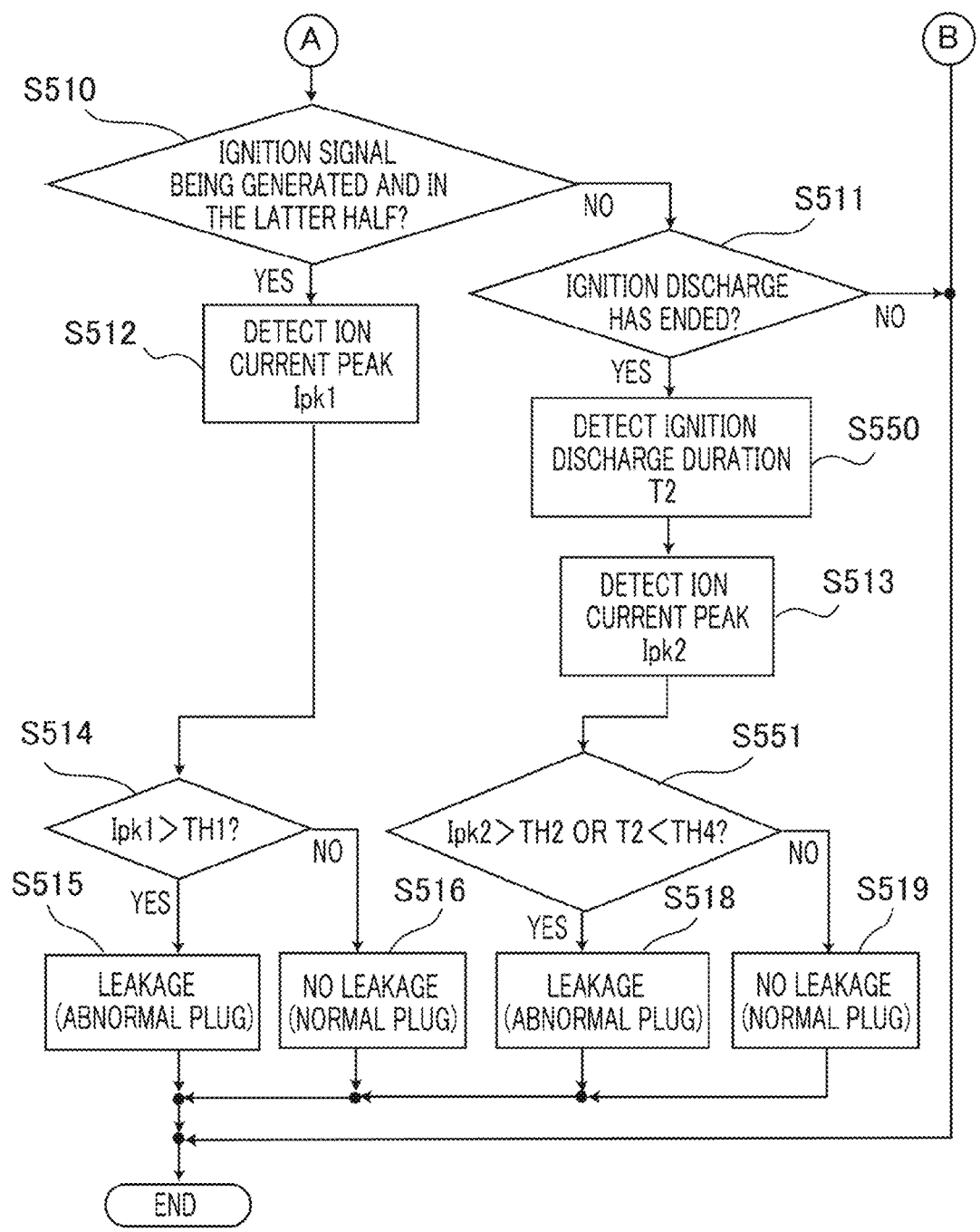

FIG. 7 (consisting of FIGS. 7A and 7B) is a flowchart representing the operation of the internal combustion engine leakage detection apparatus according to Embodiment 3 of the present invention. The basic flow of processing represented in FIG. 7 is the same as the flow of processing represented in FIG. 5 in Embodiment 1; however, the steps S550 and S551 in FIG. 7 make the flow of processing represented in FIG. 7 differ from the flow of processing represented in FIG. 5.

The time period from the ignition timing (the time instant t2 in FIG. 4F) to the timing (the time instant t3 or t3' in FIG. 4F) at which the noise current N3 or N3', respectively, produced by the LC resonance is detected is an ignition discharge duration T2. Accordingly, in the step S511 in FIG. 7, it is determined that the timing after the noise current N3 produced by the LC resonance has been detected is a timing after ignition discharge, and the ignition discharge duration T2 is detected in the step S550. Based on an timing AP at which the LC resonance noise is generated and the ignition timing IGT, the ignition discharge duration T2 is obtained through a calculation in accordance with the equation [T2=AP−IGT].

Then, in the step S551, the obtained ignition discharge duration T2 is compared with an ignition discharge duration threshold value TH4 and the ion current peak value Ipk2 is compared with the ion current peak threshold value TH2; in the case where the equation [Ipk2>TH2 or T2<TH4] is established (YES), the condition that there exists leakage in the ignition plug is stored in the step S518; in the case where the equation [Ipk2>TH2 or T2<TH4] is not established (NO), the condition that there exists no leakage in the ignition plug is stored in the step S519 and then the processing is ended.

In the foregoing internal combustion engine leakage detection apparatus according to Embodiment 3 of the present invention, because provided with an ignition discharge duration detection unit, the plug status detection unit 205 detects whether or not oil rising in the vicinity of the bottom dead center of the piston 40 provides an effect to the discharging path, even before a leakage path is formed in the ignition plug; therefore, the leakage condition of the ignition plug 3 can be detected even at a precursory stage.

Moreover, although not represented in the drawing, in the case where the ignition discharge duration T2 is longer than an ignition discharge duration threshold value TH5 (T2>TH5), the ion current peak value Ipk1 is larger than the ion current peak threshold value TH1, and the ion current peak value Ipk2 is larger than the ion current peak threshold value TH2, it can also be determined, for example, that the ignition plug is in a condition that normal discharge is not implemented, i.e., that an oil bridge is formed between the first electrode 31 and the second electrode 32 of the ignition plug 3 and hence the insulating resistance value is small.

In this situation, each of the foregoing ignition discharge duration threshold values TH4 and the TH5 may be set to a value that is preliminarily obtained from an experiment or the like or the average value of the ignition discharge duration T2 at a time immediately after cylinder resting has started, at which it is considered that ignition-plug contamination is small, may be utilized therefor.

An internal combustion engine leakage detection apparatus according to the present invention is mounted in an automobile, a motorcycle, an outboard engine, an extra machine, or the like utilizing an internal combustion engine and contributes to solving fuel depletion problem and to preserving the environment.

The foregoing internal combustion engine leakage detection apparatus according to the present invention is not limited to each one of Embodiments 1 through 3, described above; these embodiments may appropriately be combined with each other or one another.

Each of the foregoing respective internal combustion engine leakage detection apparatuses according to Embodiments 1 through is the "reduction to practice" of at least one of the following inventions.

(1) An internal combustion engine leakage detection apparatus for detecting a leakage condition of an ignition plug of an internal combustion engine provided with a function of performing a cylinder resting drive and includes a valve driving mechanism that drives an intake valve and an exhaust valve provided on an internal combustion engine; a fuel injection valve provided on a cylinder of the internal combustion engine; a cylinder resting control unit that instructs the valve driving mechanism and the fuel injection valve of an operation-resting cylinder to stop operation thereof when the cylinder resting drive is implemented; an ignition control unit that makes an ignition plug provided in a combustion chamber of the cylinder generate an ignition signal at least once when based on the instruction from the cylinder resting control unit, the fuel injection valve and the valve driving mechanism are stopping the operation thereof; an ignition coil device provided with an ion current detection circuit that detects an electric quantity based on an ion generated in the combustion chamber when the ignition plug is made to perform ignition discharge based on the ignition signal and an inflammable fuel-air mixture in the combustion chamber combusts due to the ignition discharge; and a plug status detection unit that detects a leakage condition of the ignition plug. The internal combustion engine leakage detection apparatus is characterized in that the plug status detection unit detects a leakage condition of the ignition plug, based on an output signal of the ion current detection circuit generated at a timing other than the timing at which the ignition coil device performs the ignition discharge.

In the internal combustion engine leakage detection apparatus according to the present invention, whether or not there exists leakage is determined based on the output signal of the ion current detection circuit generated at a timing other than the timing at which the ignition-signal-on induction voltage generated during cylinder resting mode causes ignition discharge; therefore, no discharge current caused by the ignition-signal-on induction voltage is erroneously detected as a leakage current and hence it is made possible to accurately detect an abnormality in the status of the ignition plug of the internal combustion engine provided with a cylinder resting function.

(2) The internal combustion engine leakage detection apparatus according to (1), characterized in that the ignition control unit generates the ignition signal at a timing when an inner-cylinder pressure is a pressure at which a voltage applied to the ignition plug at a time when the ignition signal starts to be generated does not cause the ignition discharge.

In this invention, the ignition control unit generates the ignition signal at an inner-cylinder pressure to be obtained from a preliminary experiment or the like, at which the ignition-signal-on induction voltage causes no ignition discharge; therefore, no discharge current caused by the ignition-signal-on induction voltage is erroneously detected as a leakage current and hence it is made possible to accurately detect an abnormality in the status of the ignition plug of the internal combustion engine provided with a cylinder resting function.

(3) The internal combustion engine leakage detection apparatus according to any one of (1) and (2), characterized in that the ignition control unit generates the ignition signal at timings corresponding to at least one of the vicinity of an intake bottom dead center and the vicinity of an expansion bottom dead center of a piston provided in the cylinder.

In this invention, the ignition control unit can perform each of the ignition signal generation processing and the ignition signal ending processing at both the intake bottom dead center and the expansion bottom dead center (twice per one cycle); therefore, the opportunity for detecting the plug status increases and hence contamination of the ignition plug can more quickly be detected.

(4) The internal combustion engine leakage detection apparatus according to any one of (1) through (3), characterized in that the plug status detection unit detects a leakage condition of the ignition plug, based on the output signal outputted from the ion current detection circuit at at least one of a timing in the latter half of a generation period of the ignition signal and a timing after the ignition discharge.

In this invention, the plug status detection unit detects the leakage condition, based on the output signal of the ion current detection circuit at a timing, in the vicinity of the bottom dead center and in the latter half of the ignition signal generation period, at which the ignition-signal-on induction voltage (a voltage higher than a constant voltage of as high as 100 V, such as an after-mentioned bias voltage at a time after ignition discharge), which causes no ignition discharge, is applied to the ignition plug. Accordingly, a higher voltage can be applied to the ignition plug 3 and hence even a low-level leakage current can be detected; therefore, it is made possible to detect leakage even at an early stage and to prevent a misfire at a time when the normal drive is restored from the cylinder resting drive, by purifying the ignition plug or by prohibiting the cylinder resting from being continued. Moreover, a leakage current is detected also based on the output signal of the ion current detection circuit at a time after ignition discharge; therefore, no discharge current caused by the ignition-signal-on induction voltage is erroneously detected as a leakage current and hence it is made possible to detect the leakage condition in a wide range in the vicinity of the bottom dead center.

(5) The internal combustion engine leakage detection apparatus according to any one of (1) and (3), characterized in that in the case where the peak value of the output signal outputted from the ion current detection circuit when the ignition signal is being generated is the same as or smaller than a predetermined value, the plug status detection unit detects a leakage condition of the ignition plug, based on the output signal outputted from the ion current detection circuit when the ignition signal is being generated.

In this invention, the plug status detection unit detects the leakage condition of the ignition plug when the peak value of the output signal of the ion current detection circuit during an ignition signal generation period is the same as or smaller than a predetermined value; therefore, no discharge current produced by the ignition-signal-on induction voltage is erroneously detected as a leakage current and hence it is made possible to set the timing (the induction voltage at a time when the ignition signal is on: MAX. 1 kV) at which the ignition signal is generated to a timing in the vicinity of the bottom dead center, at which oil rising is liable to occur; thus, the leakage condition can be detected even at a lower level of the leakage current.

(6) The internal combustion engine leakage detection apparatus according to any one of (1) through (5), characterized in that when the peak value of the output signal of the ion current detection circuit is the same as or larger than a predetermined value, the plug status detection unit determines that there exists leakage in the ignition plug.

In this invention, the leakage condition is detected based on the peak value of the output signal of the ion current detection circuit; therefore, it is made possible to calculate the insulating resistance value of the ignition plug based on the relationship with the induction voltage at a time when the ignition signal is on, in addition to detecting whether or not leakage exists.

(7) The internal combustion engine leakage detection apparatus according to any one of (1) through (5), characterized in that when the integration value of the output signal of the ion current detection circuit is the same as or larger than a predetermined value, the plug status detection unit determines that there exists leakage in the ignition plug.

In this invention, the leakage condition is detected based on the integration value of the output signal of the ion current detection circuit; therefore, it is made possible to prevent leakage from being erroneously detected because short-time noise enlarges the peak value of an ion current.

(8) The internal combustion engine leakage detection apparatus according to any one of (1) through (7), characterized in that the plug status detection unit has an ignition discharge duration detection unit for detecting an ignition discharge duration based on the output signal of the ion current detection circuit and detects a leakage condition of the ignition plug, based on an ignition discharge duration detected by the ignition discharge duration detection unit and the output signal of the ion current detection circuit generated at a timing other than the timing at which the ignition control unit performs ignition discharge.

In this invention, because provided with an ignition discharge duration detection means, the plug status detection unit detects whether or not oil rising in the vicinity of the bottom dead center provides an effect to the discharging path, even before a leakage path is formed in the ignition plug; therefore, the leakage condition can be detected even at a precursory stage.

(9) The internal combustion engine leakage detection apparatus according to any one of (1) through (8), characterized in that in the case where the plug status detection unit determines that there exists leakage, the cylinder resting control unit drives the intake valve and the exhaust valve so as to purify the leakage in the ignition plug.

In this invention, in the case where the plug status detection unit determines that there exists leakage, the cylinder resting control unit drives the intake valve and the exhaust valve so as to purify the leakage in the ignition plug; therefore, it is made possible to prevent the progression of plug contamination and a misfire at a time when the cylinder resting is cancelled.

(10) The internal combustion engine leakage detection apparatus according to any one of (1) through (9), characterized in that in the case where the plug status detection unit determines that there exists leakage, the cylinder resting control unit prohibits the cylinder resting drive from being continued.

In this invention, based on the peak value of an ion current and the insulating resistance value, the cylinder resting control unit issues no instruction for the cylinder resting at the starting stage of plug contamination, so that the progression of plug contamination can be prevented. Furthermore, the determination makes it possible that it is not required to preliminarily set the cylinder resting duration to be short; thus, the cylinder resting duration can be set long and hence the gasoline mileage can be improved.

Various modifications and alterations of this invention will be apparent to those skilled in the art without departing from the scope and spirit of this invention, and it should be understood that this is not limited to the illustrative embodiments set forth herein.

What is claimed is:

1. An internal combustion engine leakage detection apparatus for detecting a leakage condition of an ignition plug of an internal combustion engine provided with a function of performing a cylinder resting drive, the internal combustion engine leakage detection apparatus comprising:
   a valve driving mechanism that drives an intake valve and an exhaust valve provided on an internal combustion engine;
   a fuel injection valve provided on a cylinder of the internal combustion engine;
   a cylinder resting control unit that instructs the valve driving mechanism and the fuel injection valve of an operation-resting cylinder to stop operation thereof when the cylinder resting drive is implemented;
   an ignition control unit that makes an ignition plug provided in a combustion chamber of the cylinder generate an ignition signal at least once when based on the instruction from the cylinder resting control unit, the fuel injection valve and the valve driving mechanism are stopping the operation thereof;
   an ignition coil device provided with an ion current detection circuit that detects an electric quantity based on an ion generated in the combustion chamber when the ignition plug is made to perform ignition discharge based on the ignition signal and an inflammable fuel-air mixture in the combustion chamber combusts due to the ignition discharge; and
   a plug status detection unit that detects a leakage condition of the ignition plug, wherein the plug status detection unit detects a leakage condition of the ignition plug, based on an output signal of the ion current detection circuit generated at a timing other than the timing at which the ignition coil device performs the ignition discharge.

2. The internal combustion engine leakage detection apparatus according to claim 1, wherein the ignition control unit generates the ignition signal at a timing when an inner-cylinder pressure is a pressure at which a voltage applied to the ignition plug at a time when the ignition signal starts to be generated does not cause the ignition discharge.

3. The internal combustion engine leakage detection apparatus according to claim 1, wherein the ignition control unit generates the ignition signal at timings corresponding to at least one of the vicinity of an intake bottom dead center and the vicinity of an expansion bottom dead center of a piston provided in the cylinder.

4. The internal combustion engine leakage detection apparatus according to claim 1, wherein the plug status detection unit detects a leakage condition of the ignition plug, based on the output signal outputted from the ion current detection circuit at at least one of a timing in the latter half of a generation period of the ignition signal and a timing after the ignition discharge.

5. The internal combustion engine leakage detection apparatus according to claim 1, wherein in the case where the peak value of the output signal outputted from the ion current detection circuit when the ignition signal is being generated is the same as or smaller than a predetermined value, the plug status detection unit detects a leakage condition of the ignition plug, based on the output signal outputted from the ion current detection circuit when the ignition signal is being generated.

6. The internal combustion engine leakage detection apparatus according to claim 1, wherein when the peak value of the output signal outputted from the ion current detection circuit is the same as or larger than a predetermined value, the plug status detection unit determines that there exists leakage in the ignition plug.

7. The internal combustion engine leakage detection apparatus according to claim 1, wherein when the integration value of the output signal of the ion current detection circuit is the same as or larger than a predetermined value, the plug status detection unit determines that there exists leakage in the ignition plug.

8. The internal combustion engine leakage detection apparatus according to claim 1, wherein the plug status detection unit has an ignition discharge duration detection unit for detecting an ignition discharge duration based on the output signal of the ion current detection circuit and detects a leakage condition of the ignition plug, based on an ignition discharge duration detected by the ignition discharge duration detection unit and the output signal of the ion current detection circuit generated at a timing other than the timing at which the ignition control unit performs ignition discharge.

9. The internal combustion engine leakage detection apparatus according to claim 1, wherein in the case where the plug status detection unit determines that there exists leakage, the cylinder resting control unit drives the intake valve and the exhaust valve so as to purify the leakage in the ignition plug.

10. The internal combustion engine leakage detection apparatus according to claim 1, wherein in the case where the plug status detection unit determines that there exists leakage, the cylinder resting control unit prohibits the cylinder resting drive from being continued.

* * * * *